United States Patent [19]

Hecht

[11] Patent Number: 5,535,322
[45] Date of Patent: Jul. 9, 1996

[54] DATA PROCESSING SYSTEM WITH IMPROVED WORK FLOW SYSTEM AND METHOD

[75] Inventor: Matthew S. Hecht, Potomac, Md.

[73] Assignee: International Business Machines Corporation, Armonk, N.Y.

[21] Appl. No.: 967,090

[22] Filed: Oct. 27, 1992

[51] Int. Cl.$^6$ .................................................... G06F 3/14
[52] U.S. Cl. ............................................................ 395/155
[58] Field of Search .................................... 395/155, 149, 395/161, 275, 650; 364/188, 401, 222.22

[56] References Cited

U.S. PATENT DOCUMENTS

| | | | |
|---|---|---|---|
| 4,503,499 | 3/1985 | Mason et al. | 364/222.2 X |
| 4,751,635 | 6/1988 | Kret | 395/600 |
| 4,875,162 | 10/1989 | Ferriter et al. | 364/401 |
| 5,054,096 | 10/1991 | Beizer | 382/41 X |
| 5,109,337 | 4/1992 | Ferriter et al. | 364/401 |
| 5,121,319 | 6/1992 | Fath et al. | 364/188 |
| 5,228,123 | 7/1993 | Heckel | 395/155 |
| 5,293,475 | 3/1994 | Hennigan et al. | 395/155 X |
| 5,321,803 | 6/1994 | Ditter, Jr. | 395/155 X |
| 5,325,478 | 6/1994 | Shelton et al. | 395/155 X |

OTHER PUBLICATIONS

W. Fisher, et all, "FileNed: A Distributed System Supporting WorkFlo; a Flexible Office Procedures Control Language," IEEE Conference Paper, Apr. 27–29, 1987, Gaithersburg, MD, IEEE Computer Society Press, 1987, CH2414–1/897/0000/0226, pp. 226–232.

*Primary Examiner*—Heather R. Herndon
*Assistant Examiner*—Cliff N. Vo
*Attorney, Agent, or Firm*—John E. Hoel; Kenneth A. Seaman

[57] ABSTRACT

A Work Flow Manager (WFM), or process manager, is the software to manage and control the flow of work items from one function to the next in a well-defined application process to achieve the complete processing of those work items. Applications of WFMs include the processing of imaged or multimedia documents such as health and other insurance forms, filmless radiology, IRS tax submissions, and FBI fingerprint and voice identification. The invention WFM:

a. provides an improved, scalable subsystem and method for work flow management;

b. partitions the application (work flow) process into component distributed services, each represented by an OSF Distributed Computer Environment (DCE) service;

c. defines the application process with a state transition diagram (STD);

d. uses centralized control software with a work-in-process (WIP) manager, a work queue manager, and a WIP submission attributes data base manager;

e. defines and uses a common "pull system" protocol for communication between the WFM and the component distributed services;

f. distinguishes WIP submissions from archived submissions; and g. uses an "attribute-base file system" to store submissions, typically implemented with both a data base for submission attributes (including the current state of WIP submissions), and a distributed file system for submission contents files.

16 Claims, 22 Drawing Sheets

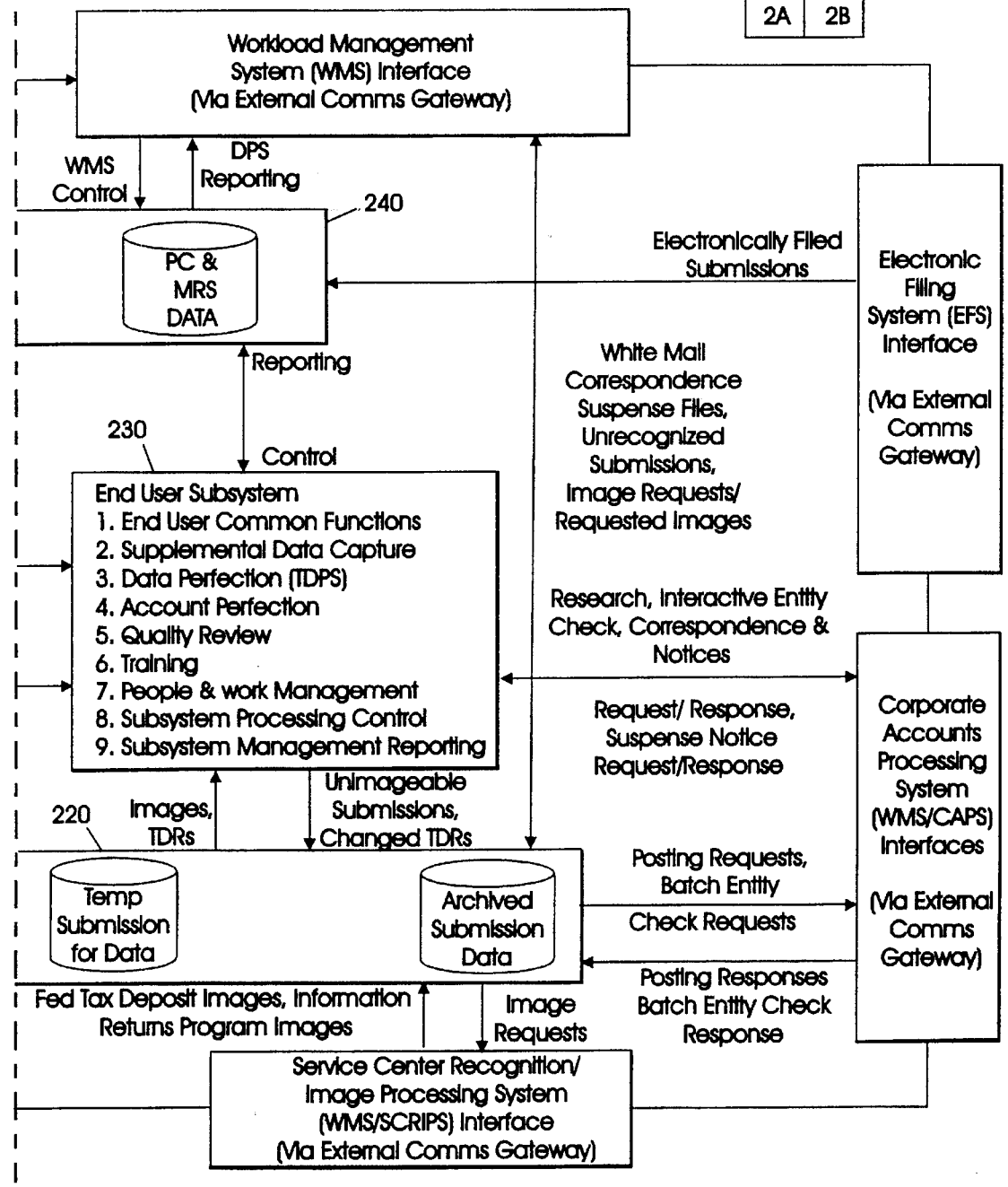

Examples of Automatic Flows

FP Needed after ICM Processing, but No EC Necessary:

(1) 410 

FP Needed after ICM, and EC Needed after FP:

(2) 420 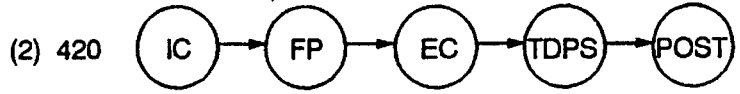

White Mail:

(3) 430 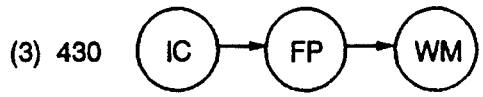

EDI with No DP:

(4) 440    EDI

FIG. 4

Examples of Semi-Automatic Flows (that Require SDC/MDC or DP)

The Major Flow = ADC, No EC Necessary, SDC:    ADC = Automatic Data Capture (i.e., IC and FP)

(5) 450 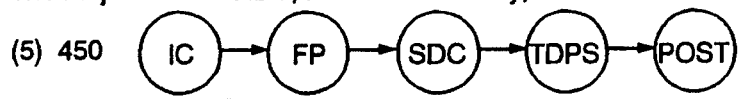

ADC, EC Ready, SDC:

(6) 460 

ADC, EC Ready, SDC, DP:

(7) 470 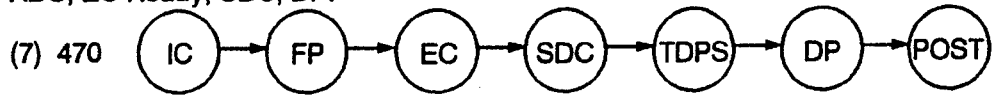

ADC, Not EC Ready, SDC:

(8) 480 

ADC, Not EC Ready, SDC, DP:

(9) 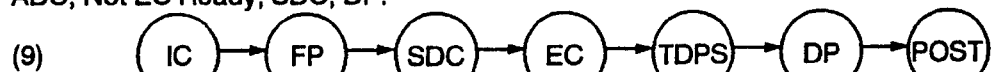

Post Fails, Suspended:

(10) 

MDC (Manual Data Capture, i.e., "Original Entry"), DP:

(11) 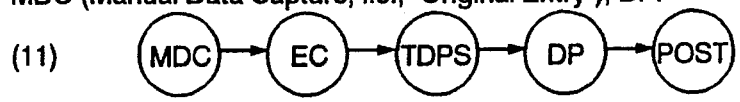

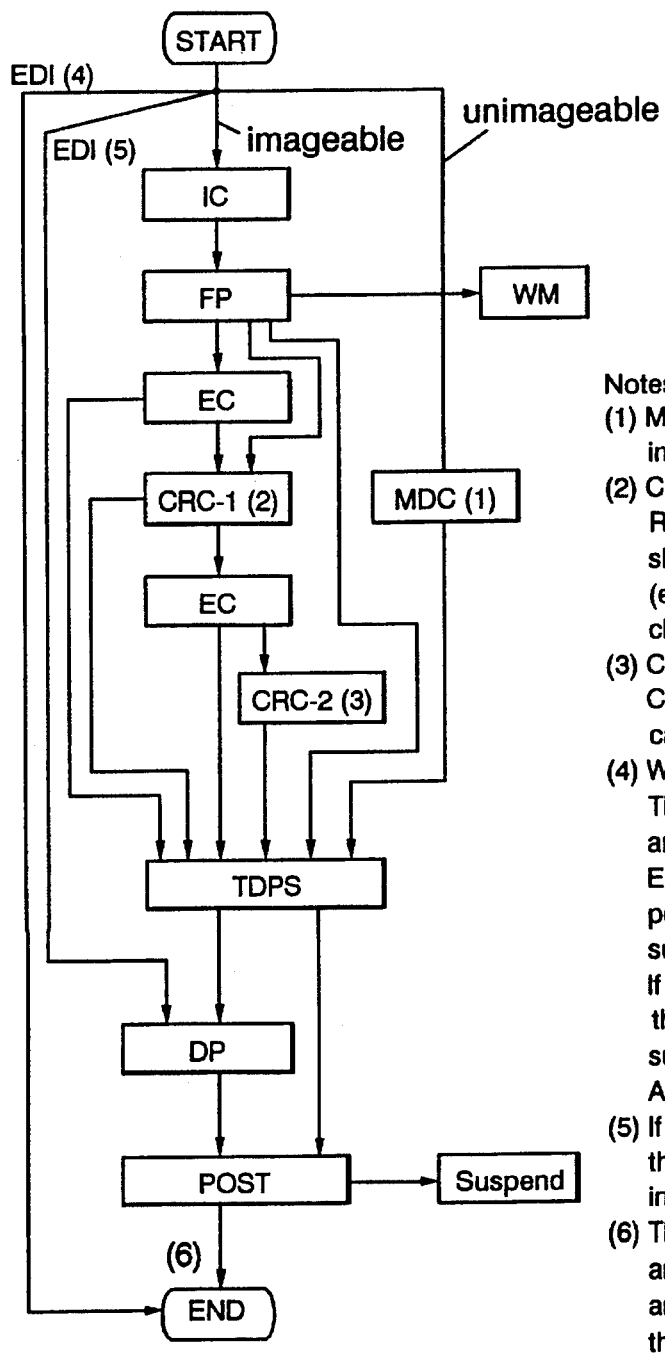

FIG. 5

Notes
(1) MDC (Manual Data Capture) also has interactive entity checking.
(2) CRC-1, the first pass of Character Recognition Correction, also captures short entity data. If the name changes (e.g., marriage) or if the address changes, then capture such changes.
(3) CRC-2, the second pass of Character Recognition Correction, captures long entity data.
(4) We assume that EFS performs EC, TDPS, and Post all prior to sending an EDI submission to DPS, and that EC is positive. If TDPS and Post are positive, then DPS archives the EDI submission file.
If TDPS is positive and Post fails, then the DPS archives the EDI submission, and WMS schedules it for Account Perfection.
(5) If the TDPS check by EFS fails, then the EDI submission undergoes DP in DPS.
(6) This diagram does not show DPS archiving because in our DPS solution, archiving is an asynchronous process that is enabled when we know the submission type (retention class).

FIG. 6A

| Long Name | Short Name | Owning System | Housing System | Housing DPS Subsystem |
|---|---|---|---|---|
| Account Perfection Service | AP | WMS | DPS | EU |
| Archived Submission Retention Management Service | RM | DPS | DPS Archives | S&R |
| Archives Request Queue Manager | RQM | DPS | DPS | S&R |
| Archives Service | Archives | DPS | DPS | S&R |
| Audit Trail Service | Audit | DPS | DPS | PC&MR |
| Backup Archives Service | BA | DPS Archives | DPS | S&R |
| Character Recognition Service | CR | DPS | DPS | DIP |
| Data Perfection Service | DP | DPS | DPS | EU |
| EDI In-Bound Service | EDI | DPS | DPS | PC&MR |
| EDI Overlay Service | EDI-O | DPS | DPS | S&R |
| EFS EDI ASCII Submission Service | EFS | EFS | EFS | |
| Entity Check Service | EC | WMS | WMS | |
| Facsimile Submission Service | FAX | WMS | WMS | PC&MR |
| File Purging Service | PurgeFile | DPS | DPS | EU |
| File Server Work Staging Service | FS Stage | DPS | DPS | |
| Forms Processing Service | FP | DPS | DPS | DIP |
| Forms Recognition Service | FR | DPS | DPS | DIP |
| IDRS Service | IDRS | WMS | WMS | |
| Image Capture function (not a service) | IC | DPS | DPS | DIP |

| | | | |
|---|---|---|---|
| Image Separation Service | IS | DPS | DIP |
| Management Reporting Service | MR | DPS | PC&MR |
| Processing Control Manager | PCM | DPS | PC&MR |
| Quality Review Service | QR | DPS | EU |
| Registry Service | Registry | DPS | PC&MR |
| Software Distribution Service | SD | DPS | PC&MR |
| Submission Index Entry Moving Service | EntryMove | DPS | S&R |
| Submission Type Recognition (not a Service) | STR | DPS | DIP |
| Supplemental Data Capture Service | SDC | DPS | EU |
| System Maintenance Service | Maint | DPS | PC&MR |
| System/Network Management Service | SM | DPS | PC&MR |
| TDR Posting Service | Post | WMS CAPS | WMS CAPS |
| TDR Purging Service | PurgeTDR | DPS | PC&MR |
| TDR Validating Service | TDPS | WMS | EU |
| Temporary Storage Service (part of OSF DCE Distributed File Service) | TS | DPS | S&R |
| White Mail Service | WM | WMS | |
| Work-In-Process Manager | WIPM | DPS | PC&MR |
| Work Queue Manager | WQM | DPS | PC&MR |
| Workstation Work Staging Service | WS Stage | DPS | EU |

FIG. 6B

| FIG. 6A |
|---|
| FIG. 6B |

FIG. 6

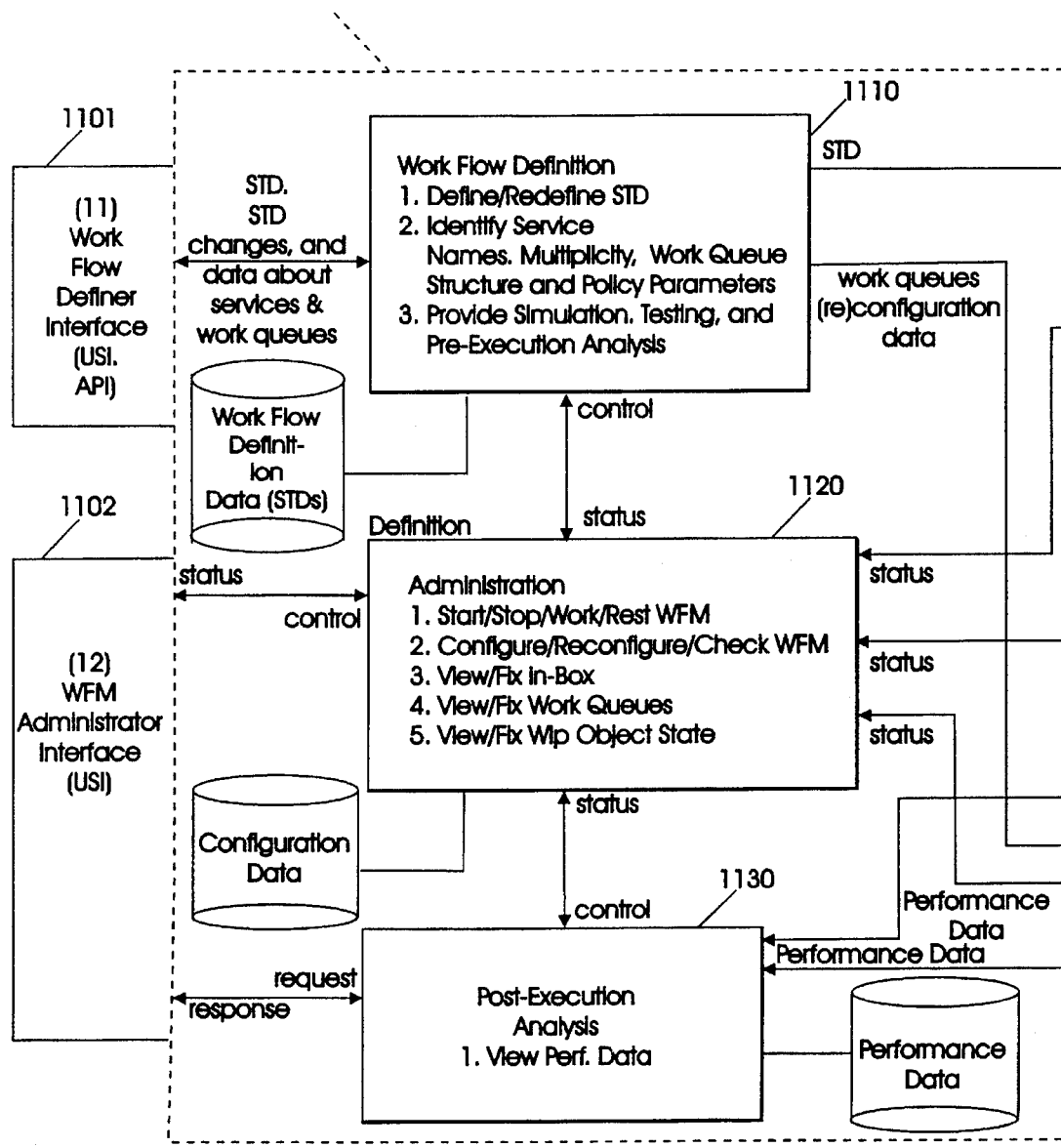

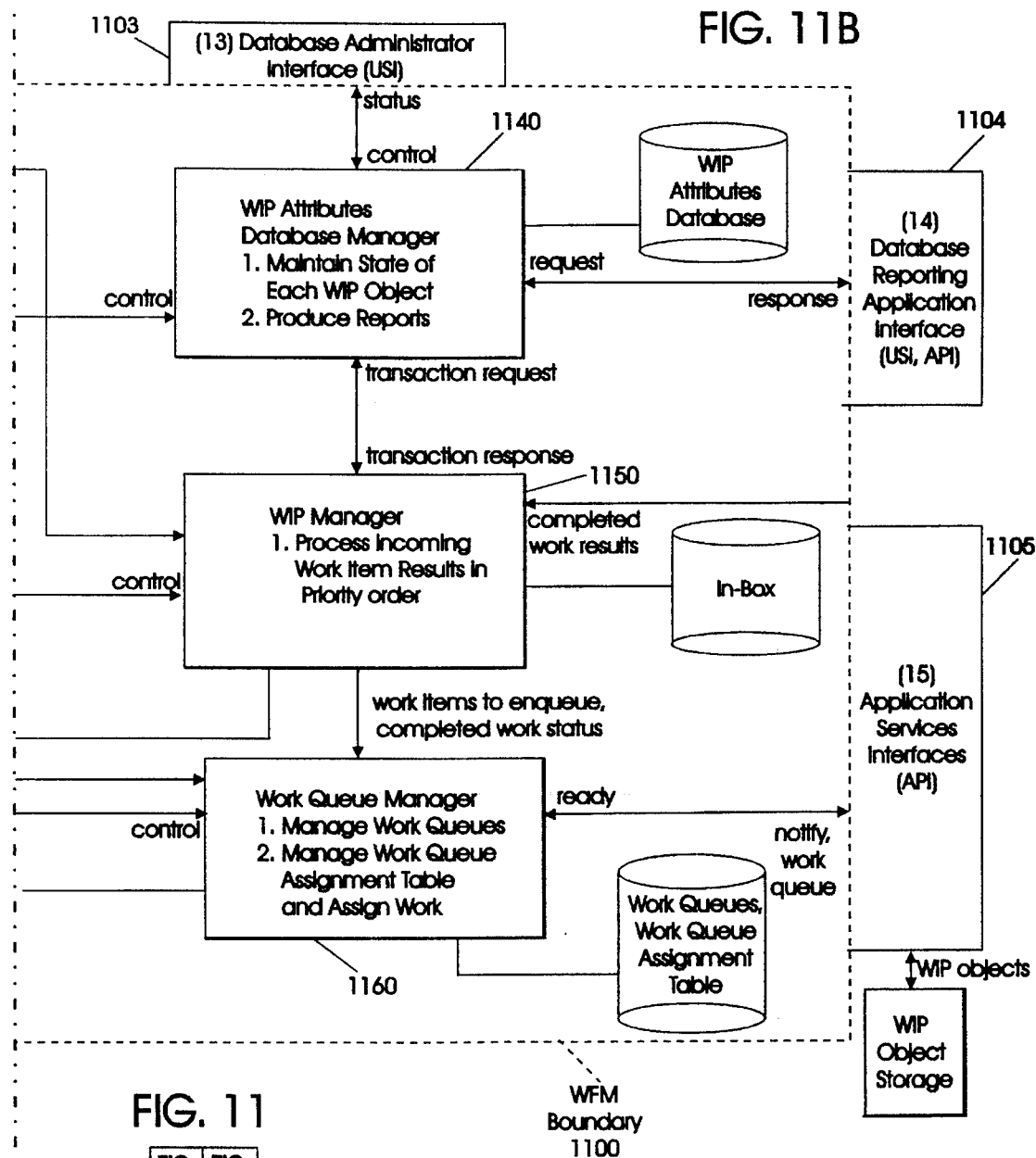

FIG. 13

Minimum Notation

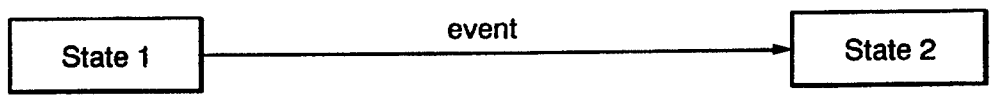

General Notation

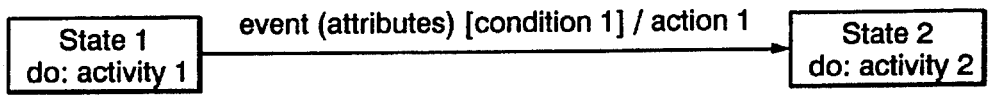

Initial and Final States Notation

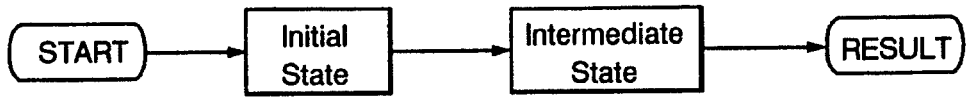

Definitions

| | |
|---|---|
| State diagram | = a directed graph that represents the life cycle of an object instance of an object class, whose nodes are states and whose directed arcs are transitions labeled by event names |
| state | = an abstraction of the attribute values and associations of an object at a particular time, as the response of the object to input events |
| event | = something that happens instantaneously at a point in time |
| activity | = an atomic operation that takes time to complete, starts on entry to a state, and stops before or on exit from a state |
| attributes | = data values conveyed with event |
| condition | = a "guard" on a stable transition (event), a guarded transition fires when its event happens and the guard condition is true |
| action | = an instantaneous operation associated with an event |

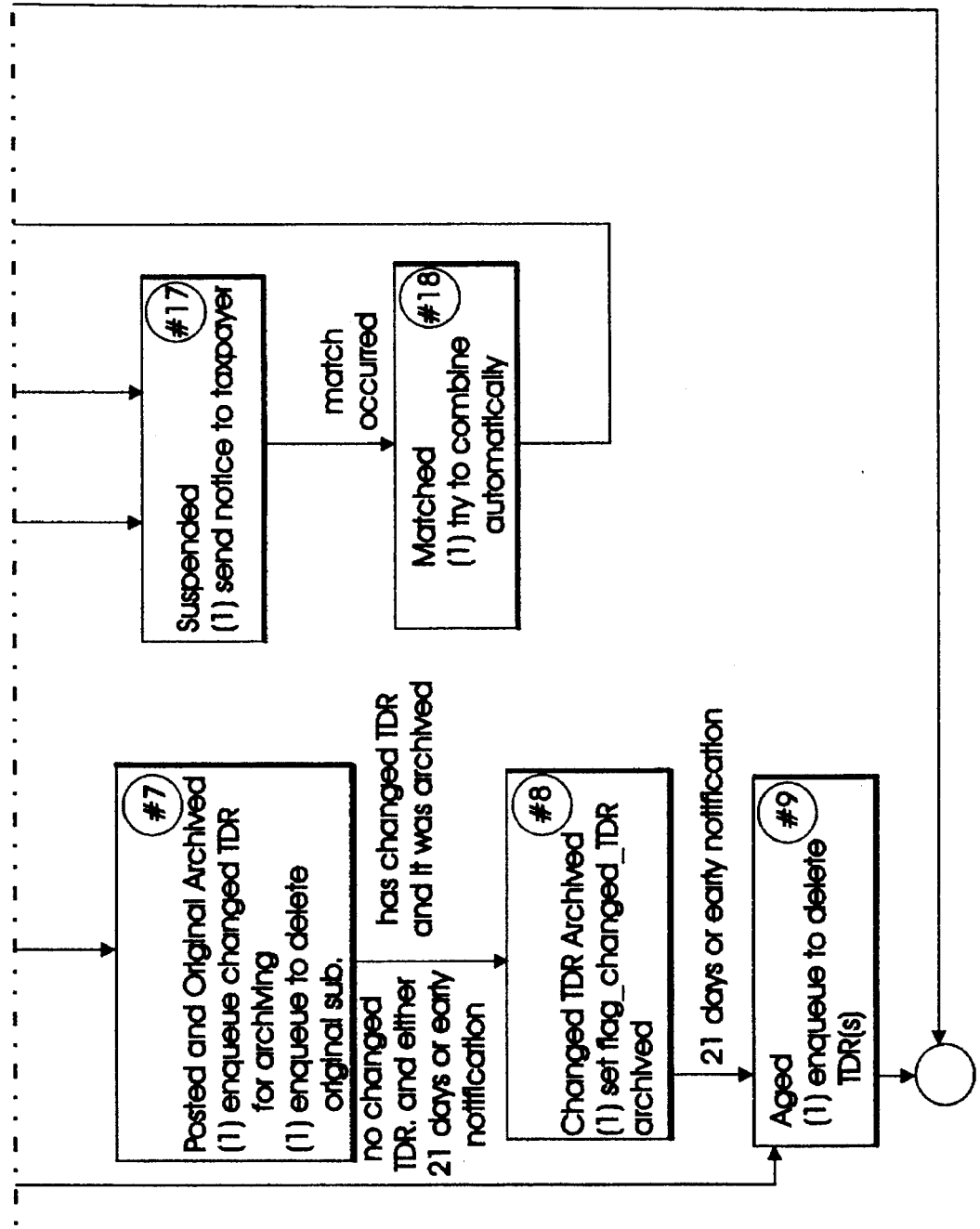

FIG. 15

| | | |
|---|---|---|
| 1501 | (1) | Service B notifies the work queue manager with an RPC that it is ready for work. |
| 1502 | (2) | The work queue manager records this potential work assignment in its work asignment table. |
| 1503 | (3) | Service A completes work and so notifies the WIP manager with an RPC that adds the work completion notice to the in-box. |
| 1504 | (4) | The WIP manager gets the next item of highest priority from the in-box. |
| 1505 | (5) | The WIP manager updates the state of the WIP submission attributes database. |
| 1506 | (6) | The WIP manager tells the work queue manager with an RPC to enqueue work items, and in the same RPC tells the work queue manager that work completed. |
| 1507 | (7) | The work queue manager enqueues work items on service-specific queues. |
| 1508 | (8) | When a work queue for Service B is ready, the work queue manager assigns it to a ready Service B, and records the work assignment in its work queue assignment table. |
| 1509 | (9) | The work queue manager notifies Service B with an RPC of the assignment and the name of the work queue file. |
| 1510 | (10) | Service B copies the work queue file. |
| 1511 | (11) | Service B reads copies of objects it needs from temporary dtorage. |
| 1512 | (12) | Service B performs the work. |
| 1513 | (13) | Service B writes changed objects or new objects into temporary storage. |
| 1514 | (14) | Service B completes work and so notifies the WIP manager with an RPC that adds the work completion notice to the in-box. |
| 1515 | (15) | Like (1), Service B notifies the work queue manager with an RPC that it is ready for work. |
| 1516 | (16) | Go to step (4). |

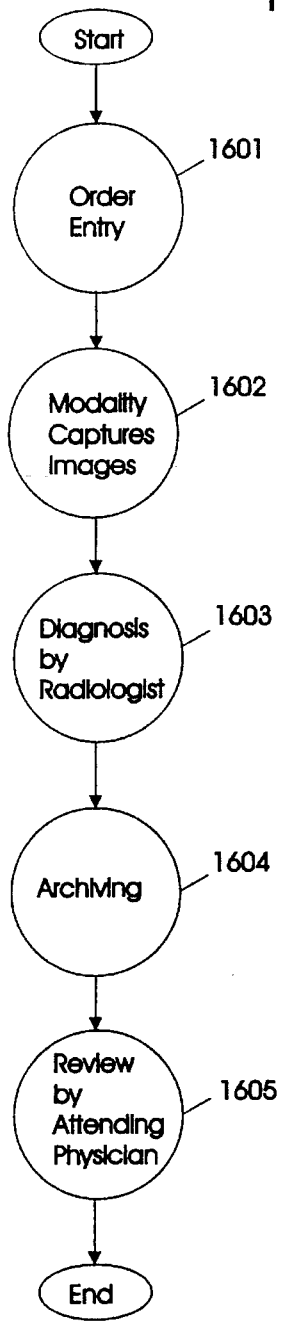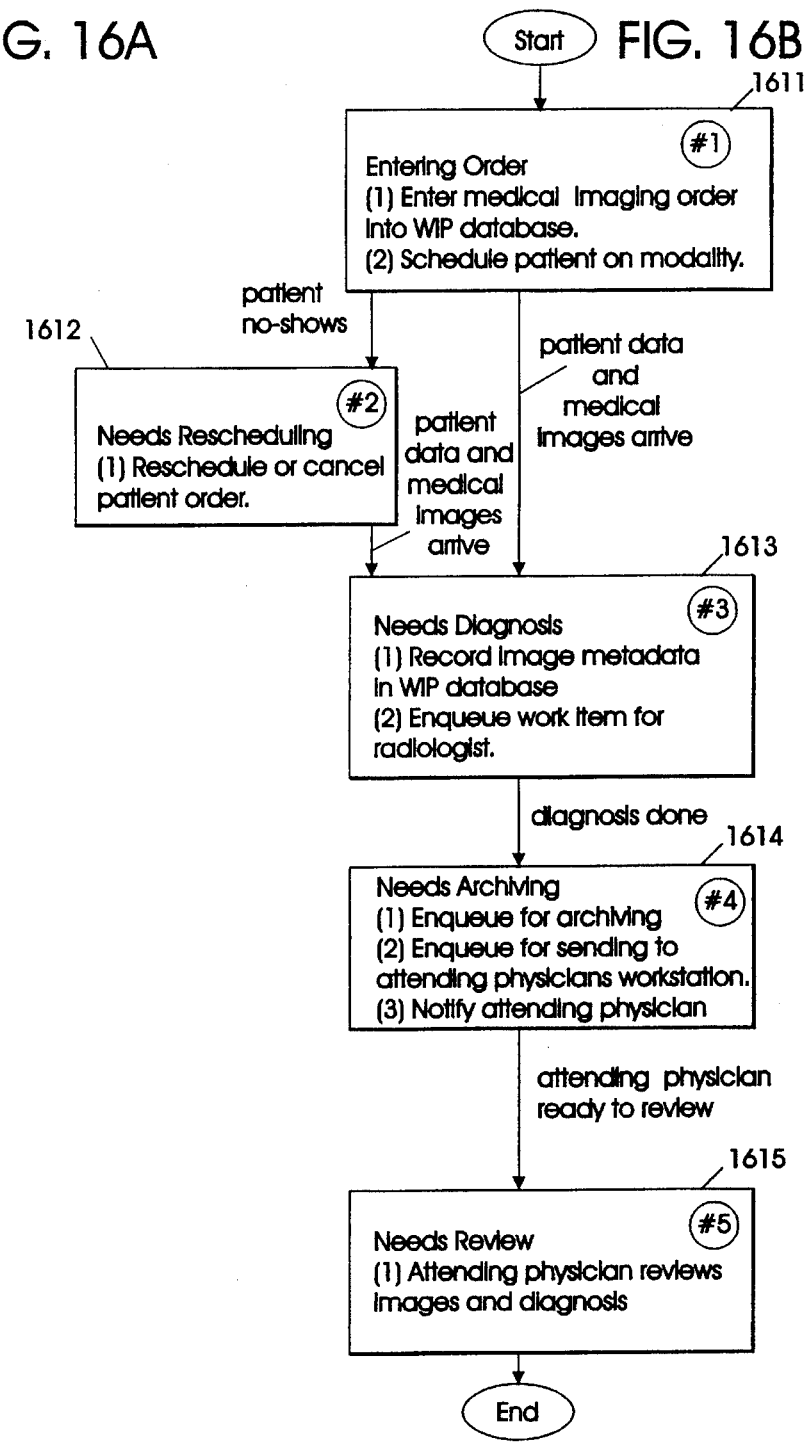

DATA PROCESSING SYSTEM WITH IMPROVED WORK FLOW SYSTEM AND METHOD

BACKGROUND OF THE INVENTION

1. Field of the Invention

The invention disclosed broadly relates to data processing and more particularly relates to the architecture and methods of work flow management in a distributed data processing system.

2. Prior Art

The following patent application relates to the invention:

U.S. patent application Ser. No. 07/902,908 filed Jun. 22, 1992 entitled "System and Method for Establishing Work Procedures in a Work Process Management System," by Marvin Addink, et. al., assigned to the IBM Corporation, now abandoned.

(Mason 1985) U.S. Pat. No. 4,503,499 by G. R. Mason, et al., entitled "Controlled Work Flow System" (Mar. 5, 1985);

(Beizer 1991) U.S. Pat. No. 5,054,096 by M. M. Beizer, entitled "Method and Apparatus for Converting Documents into Electronic Data for Transaction Processing," (Oct. 1, 1991) and the related Invention identified above.

To understand prior art, it is necessary to understand differing associated terminology.

(Mason 1985) describes an invention "system for automating office procedure to coordinate the flow of work on (imaged) documents and the transmittal of documents between office personnel," but it uses a different work flow management method than the present invention.

"In the controlled work flow process, the scheduling of work tasks in a project is controlled by the program executed by the data processor, which program is called the "work daemon." Each paperwork project involving a multiplicity of documents and a multiplicity of personnel to work on the documents is referred to as an "effort" and files referred to as RO files, each designating the schedule of paperwork for a given effort, are stored in the memory. Each effort is broken down into tasks with each task to be performed by one individual worker on one document. These tasks are called "work events." The individual workers and managers who make use of the controlled work flow system are called "users." The work daemon operates on the effort RO files to notify the users at the work stations that work events are ready to be carried out and issues BORROW, RETURN, STORE, and COPY requests to the central library facility to transmit documents between the work station processors and the central library facility. When a user indicates that he wishes to proceed with a specified work event, which involves modification of an existing document, the work daemon will issue a BORROW request to the central library facility to cause the document of the work event to be sent to the work station processor corresponding to the user for the work event. When a user indicates that he has completed a work event on a borrowed or newly created document, the work daemon will issue a RETURN or STORE request to the central library facility and cause the document, as modified, to be sent back to the central library facility for storage back in the library memory.

"An effort manager will be named to be in charge of each effort and an effort manager will usually have the responsibility for setting up the schedule of work events in a work effort. This schedule is called a "route specification" and each effort RO file is generated from the information in a route specification. To generate a route specification, the effort manager makes use of a program called the "effort program" in which he enters the data of a route specification into the computer system by means of one of the work stations. The effort program is preferably resident at each of the remote processors. The data will go first into a route specification file and, from the route specification file, it will be compiled into an effort RO file and stored in the memory."

(Beizer 1991) describes an invention for subjecting a large volume of scanned documents to transaction processing, together with routing programs to dictate the information flow, but it provides almost no detail on how the routing method works. It states the following about the routing program, which is the method for work flow management: "Basically the route program decides where the image of the document, images of related documents and data extracted by an optical character reader (OCR), which together form the "record," are to be transmitted and when. This routing program considers the document type, overall workload in the company, the capabilities of the department, and special instructions. The special instructions may be created by operator intervention so that privileged customer documents are given priority treatment." In contrast, the invention described herein provides details on a specific family of routing methods.

The related invention identified above, describes an invention that defines a method for establishing and executing work procedures in a work process management system for either imaged documents or multimedia documents, but compared to the present invention it uses a different work flow definition method, it is based on a different system architecture, and it has a different theory of operation. It defines a "work process" as a combination of "work baskets," "decision points," "collection points." "events," and "routes". An "object" is the smallest unit within the system (e.g., single document image, voice record, video record), a "folder" is a collection of objects with a common identifier, and a "work package" is (or points to) the entity that is worked on by a work process; a work package has a "work package" is (or points to) the entity that is worked on by a work process; a work package has a "work package identifier" and a "work package instance." The method defines a relational database based on these concepts, populates it with the details of a specific application through use of a work management definition program, and uses the database to maintain the state of work package instances for that specific application through use of control programs at a host computer and workstations. In contrast to (BT9-92-005), the invention described herein partitions the work flow into a centralized control component and a distributed services component, defines the work flow with a general STD, and uses s centralized control mechanism with centralized work queues to dispatch work to those services.

Existing commercially available work flow management software products known to the applicant differ in theory of operation and other key features from the present WFM invention. IBM ImagePlus, used by USAA for automobile insurance form processing, does not use DCE, does not run on a POSIX-based operating system, and does not use the same "pull system" method, among other differences. Likewise holds for TASC-Flow (TASC 1992), used in a major bank's mortgage processing division. The Plexus work flow manger, used by American Express, does not use DCE and has a different theory of operation. Scale-up properties of commercially available work flow management software, while unbounded in principle, are not widely understood except for specific installation.

BACKGROUND

A work flow manager (WFM), or process manager, is the software to manage and control the complete processing or those work items. A WFM is sometimes referred to as a "router" or "traffic cop" since it manages (controls, monitors, maintains) the flow of imaged work; it typically includes a "dispatcher" to apportion out work assignments. Applications of WFMs include the processing of imaged or multimedia documents for health and other insurance forms, filmless radiology, IRS tax submissions, and FBI fingerprint and voice identification.

A combined architecture and method for a scalable, WFM is needed to address emerging, huge-size, federal image processing problems. This WFM software should execute on a POSIX-based operating system (e.g., see (EEE POSIX 1003.1 1990), Lewine 1991), since federal programs typically require POSIX compliance. In addition, such a WFM should be based on OSF Distributed Computing Environment (DCE) OSF DCE 1991), an emerging de facto standard for distributed computing. Prior to this invention, this applicant knows of no such WFM.

An illustrative WFM application is for the IRS Document Processing System (DPS), an IRS Tax System Modernization (TSM) program to automate IRS Service Center operations by scanning incoming paper tax submissions and using image processing techniques to complete the work. DPS is defined in references (IRS DPS RFP 1991), (IRS DPS RFP Amendments), (IRS DPS RFP Q&A), and (IRS TSM 1991), DPS has a peak period processing requirement (in April) of about 232K tax submissions/day (or about 3.1M images/day), per IRS Service Center. The size of DPS at one IRS Service Center is estimated by some measures at over ten times the size of the USAA application of IBM ImagePlus, previously considered a large application of imaging and work flow. Unlike the USAA application however, DPS requires production scanning and optical character recognition.

OBJECTS OF THE INVENTION

An object of the invention is to provide an improved, scalable method for work flow management in a distributed data processing system. An intended and illustrative application of this method is for the IRS DPS.

Another object of the invention is to provide an improved method for work flow management that uses OSF Distributed Computing Environment (DCE) and that can use POSIX-based operating systems in a distributed data processing system.

A further object of the invention is to provide a common "pull system" protocol for component DCE services comprising the application work flow controlled by work flow management in a data processing system.

SUMMARY OF THE INVENTION

Problem Statement. This WFM has the following requirements and properties.

(a) Design Requirements

POSIX based—it can run on a UNIX or UNIX-like operating system;

scalable—the WFM mechanism can scale-up well to production image applications that include automated components, production workers, and knowledge workers, such as the IRS DPS; and application flexibility—the WFM mechanism applies to the IRS DPS application, and can evolve gracefully as the DPS application evolves over time.

Invention Properties. This WFM design satisfies the above design requirements and in addition has the following properties.

(b) Software Environment Properties is based on OSF DCE-implements functions of the application process as OSF DCE application services; executes under OSF DCE (OSF DCE 1991;

Uses an "attribute-based file system" to store work-in-process; the attribute-based file system can be implemented with a database system to store the state and other attributes of work objects and with a distributed file service like OSF DCE Distributed File Service (DFS) to store work objects (e.g., files containing imaged documents and related data); and (c) Invention Properties (c1) has application generality and flexibility—an application-specific state transition diagram (STD) defines the application process to be managed, where the STD can capture conditional work flow; during operation, the WFM administrator can alter the application process STD under certain conditions; see Chapter 5 in (Rumbaugh 1991) for a definition of a STD;

(c2) uses centralized control software—has a work-in-process manager (software) to manage the states of all work items, and has a work queue manager (software) to manage work items for the application process services;

(c3) fills the service-specific work queues with work items (c.g., unique submission identifiers and minimal service-related work item attributes) such that a work queue for a service can feed multiple copies of that service, and the contents of work queues are resilient to the failure or nonavailability of the services they feed;

(c4) uses an overall "pull system" design (application services "pull" work to do; the mechanism does not "push" work on services) to achieve simplicity of mechanism and to accommodate differences in the time to complete the various process functions (human, semi-automated, automated).

The insight and subtlety of this invention lie in its overall simplicity of mechanism, in the selection ad integration of its design component mechanisms (i.c., DCE, attribute-based file system, embedded STD, centralized control, partitionable and resilient work queues), and in the overall "pull system" design. The applicant knows of no other WFM with the above combination of properties.

BRIEF DESCRIPTION OF THE DRAWINGS

The features and advantages of the invention will be more fully appreciated with reference to the accompanying figures. FIG. 1 to FIG. 7 help present the DPS application, a representative example, its overall architecture and work flow. FIG. 11, FIG. 12, FIG. 14, FIG. 15, and FIG. 16 illustrate the invention, and FIG. 13 defines the notation used in FIG. 14. FIG. 12 best illustrates the invention (method).

DESCRIPTION

Figure 1:
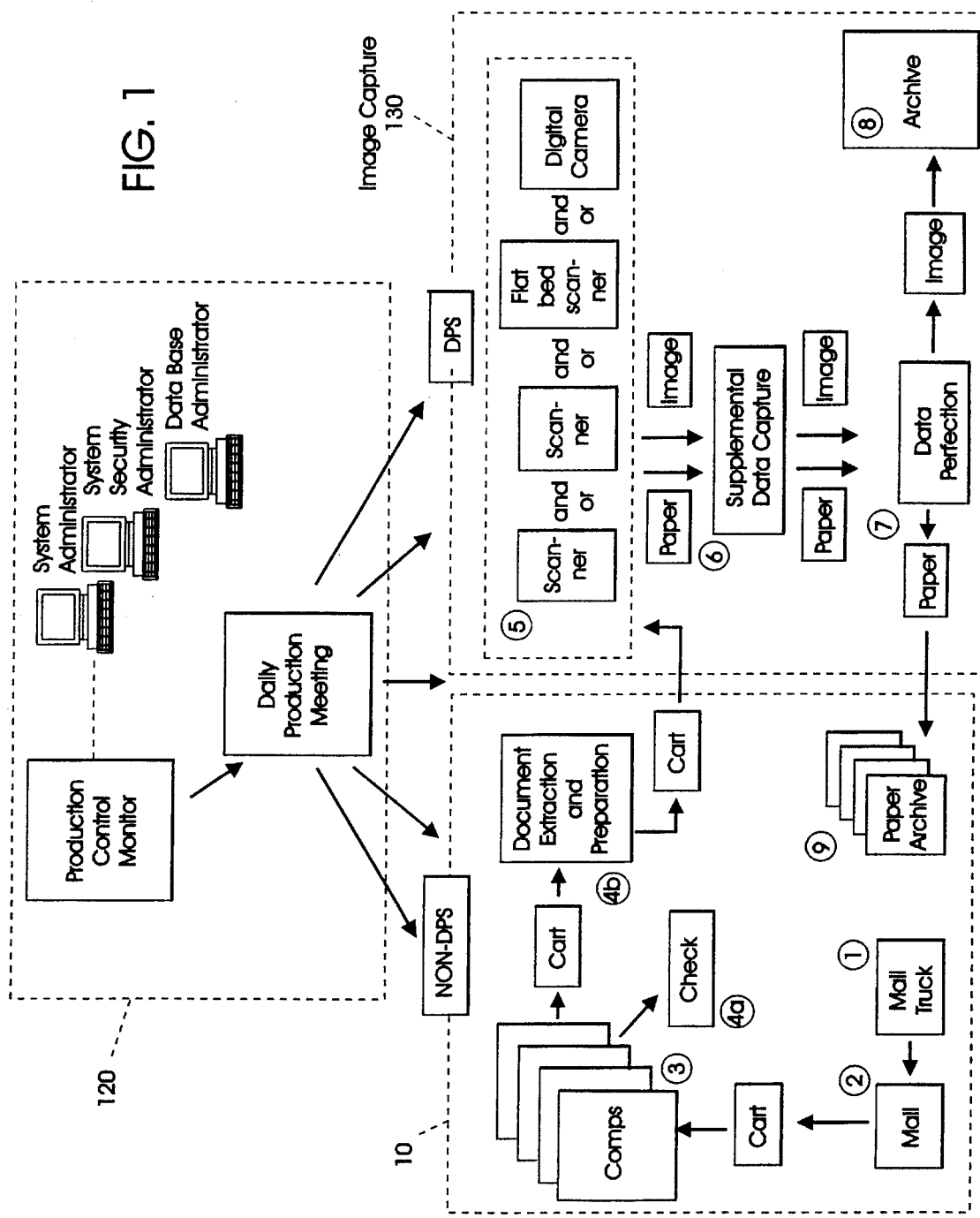

FIG. 1 shows DPS operation form the worker's perspective.

Figure 2A:
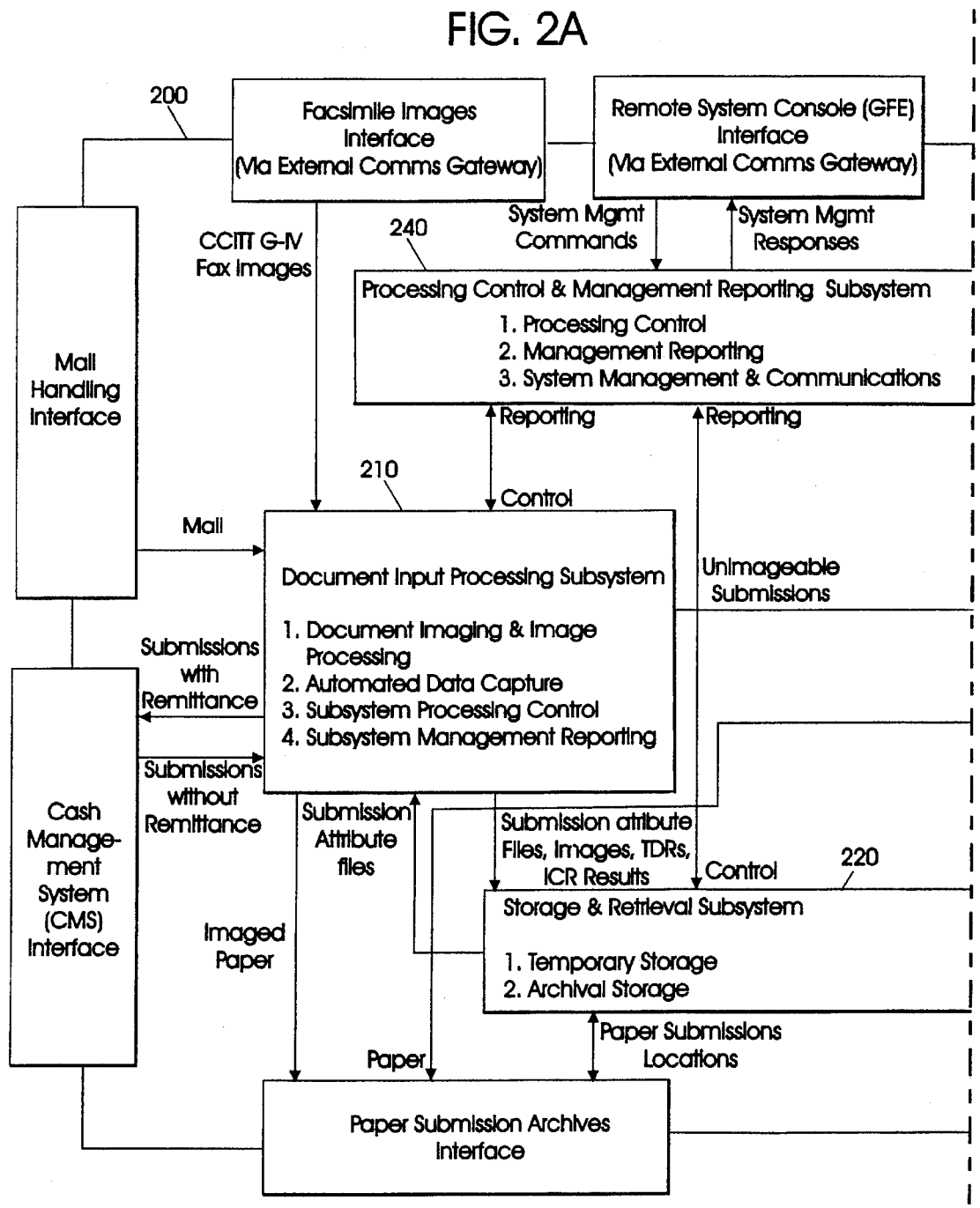
Figure 3A:
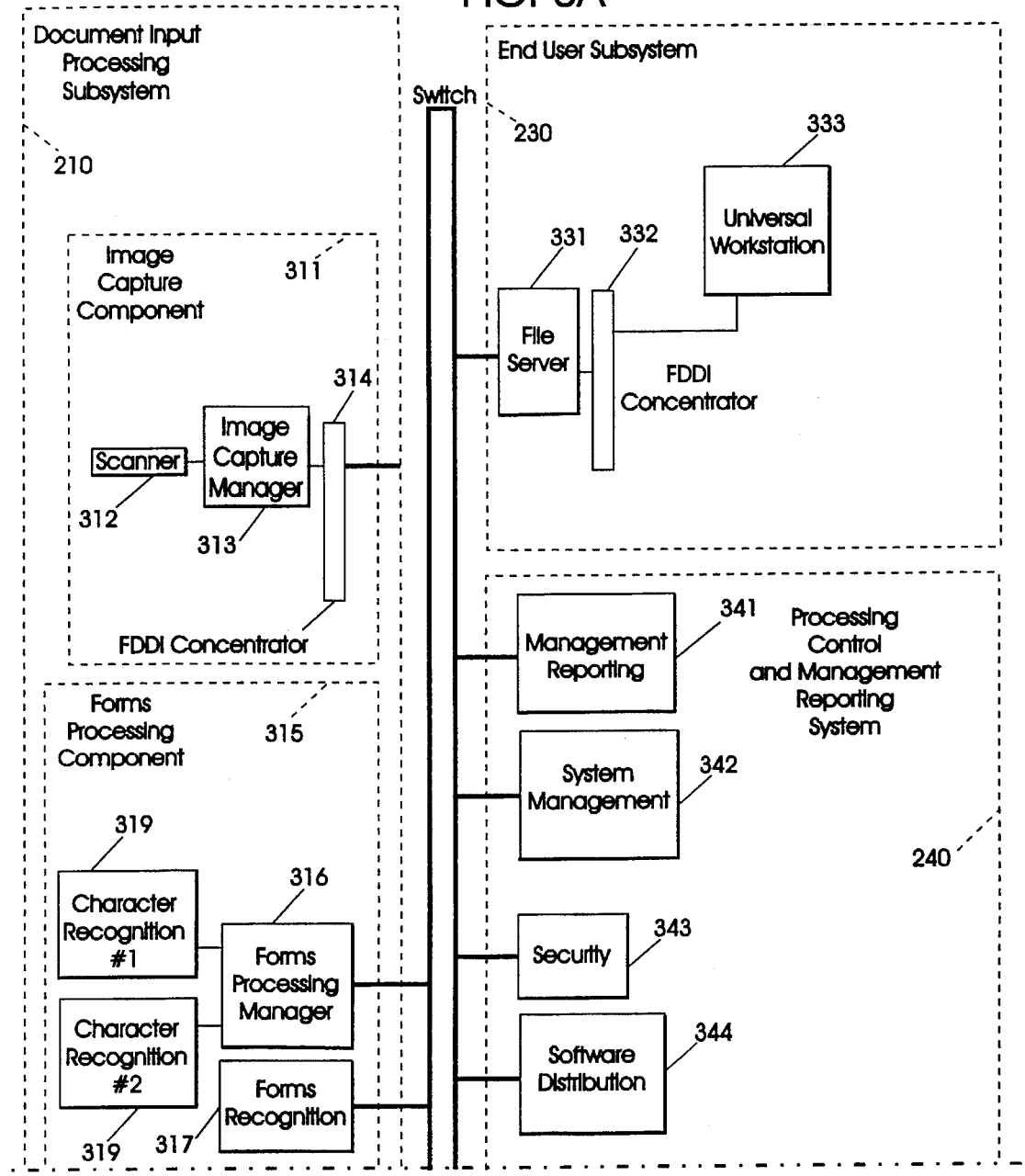
Figure 3B:
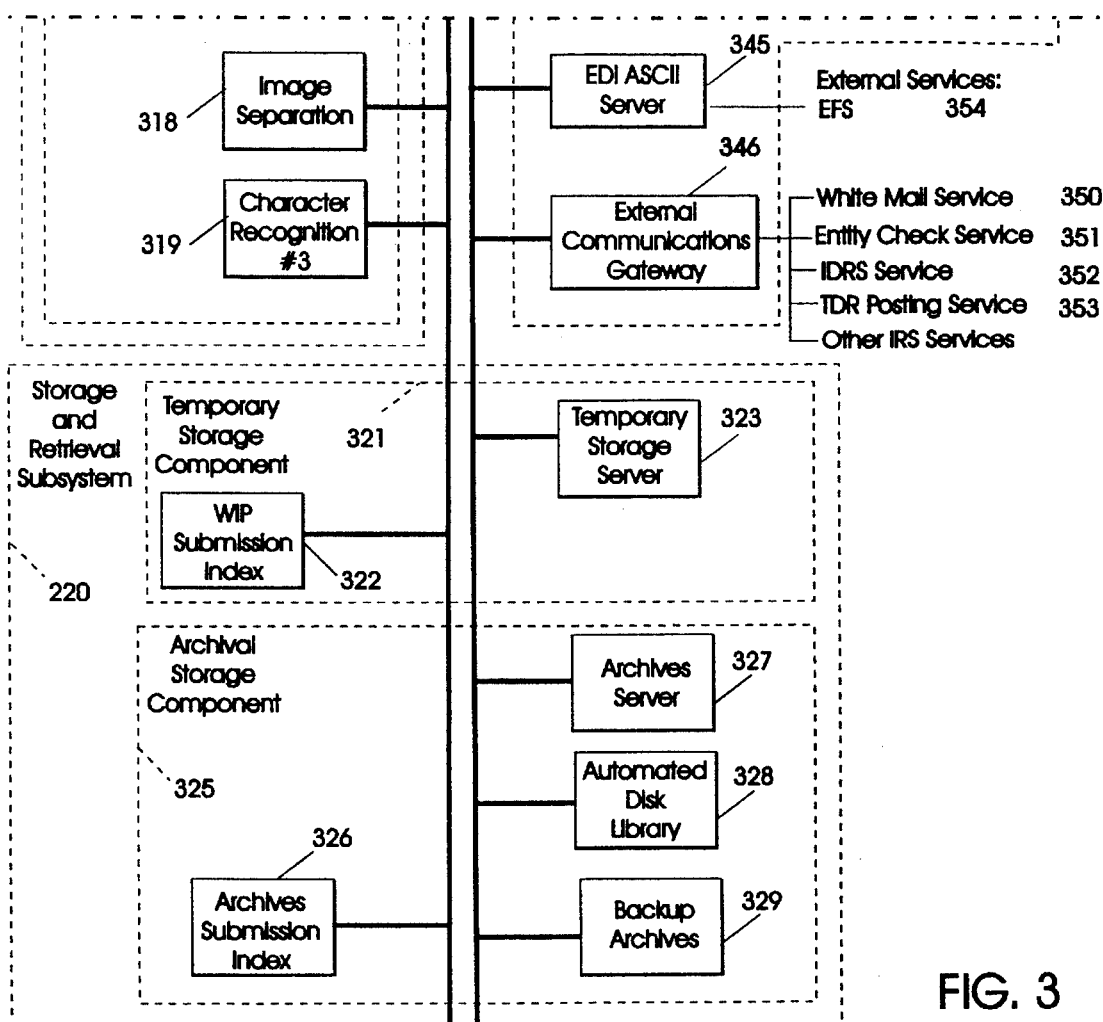
Figure 3:
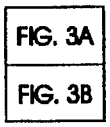

FIG. 2 is a representative DPS architecture, shown as a top-level functional architecture diagram FIG. 3 is an example DPS distributed architecture consistent with FIG. 2.

FIG. 4 shows DPS conditional flow examples.

FIG. 5 summarizes the DPS conditional flow examples in one diagram.

FIG. 6 lists DPS and non-DPS application software structured as services.

Figure 7:
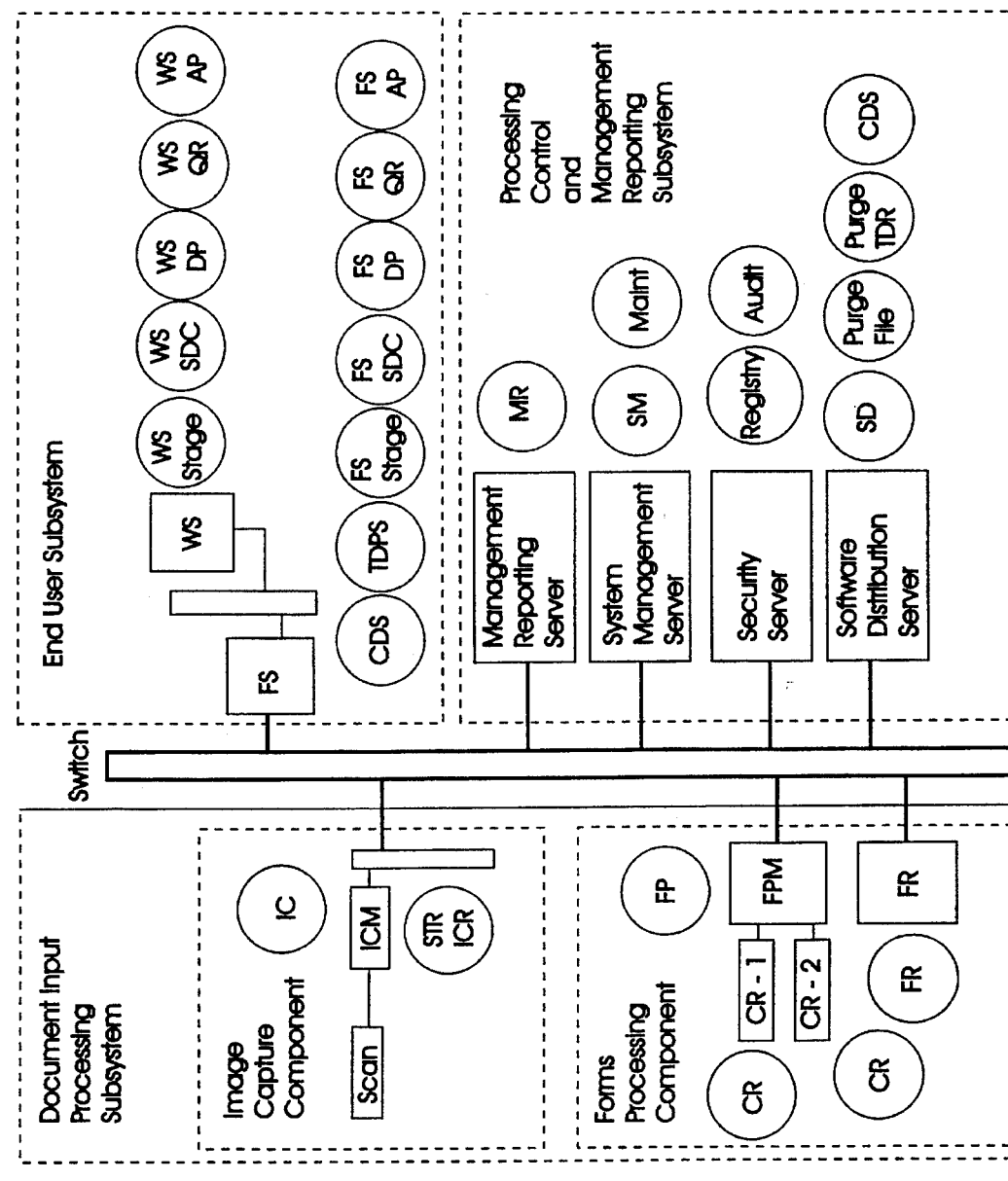
Figure 7B:
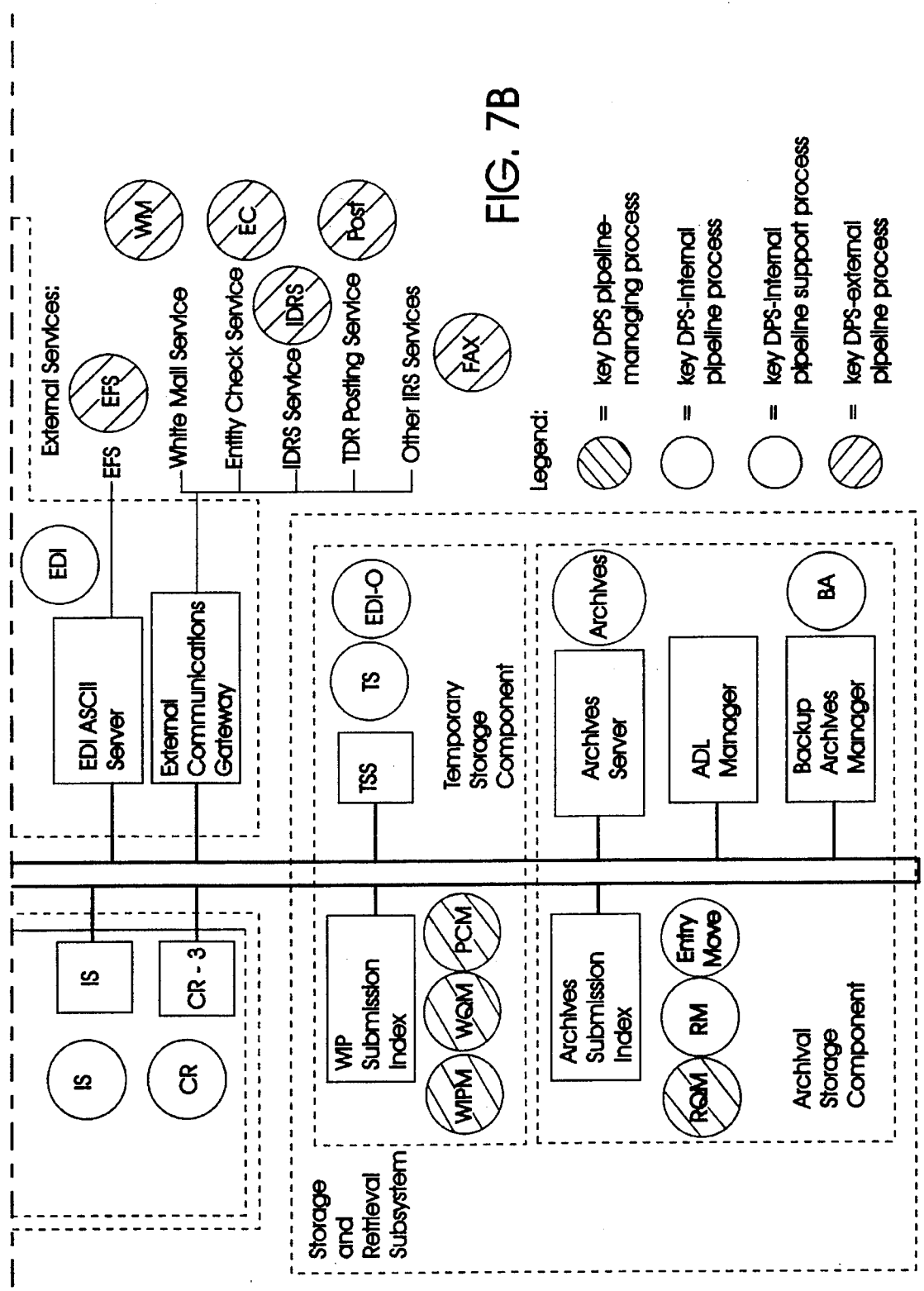

FIG. 7, which combines FIG. 3 and FIG. 6, shows where key DPS software services execute.

FIG. 7, which combines FIG. 3 and FIG. 6, shows where key DPS software services execute.

Figure 8:
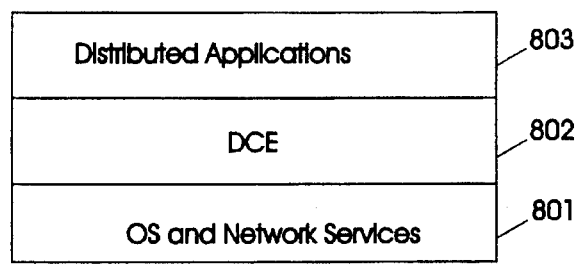
FIG. 8 and FIG. 9 help illustrate DCE.

FIG. 8 shows the layering of DCE and related software.

Figure 9:
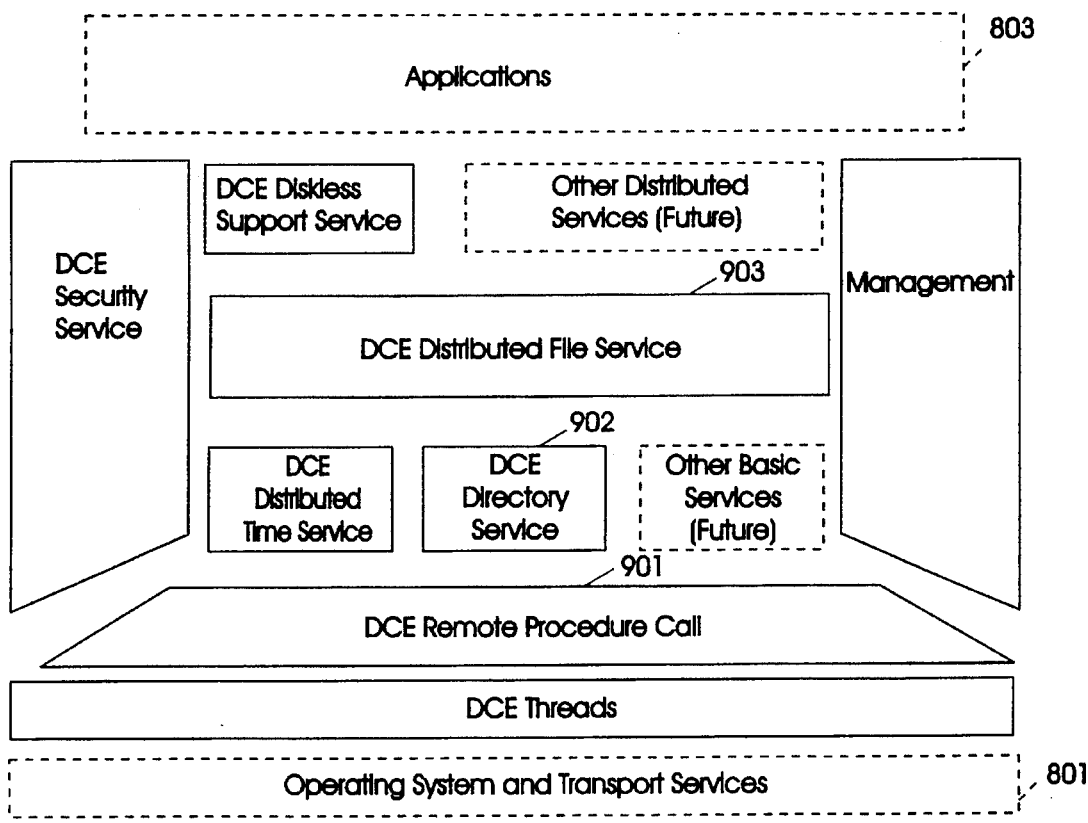

FIG. 9 is the DCE architecture.

Figure 10:
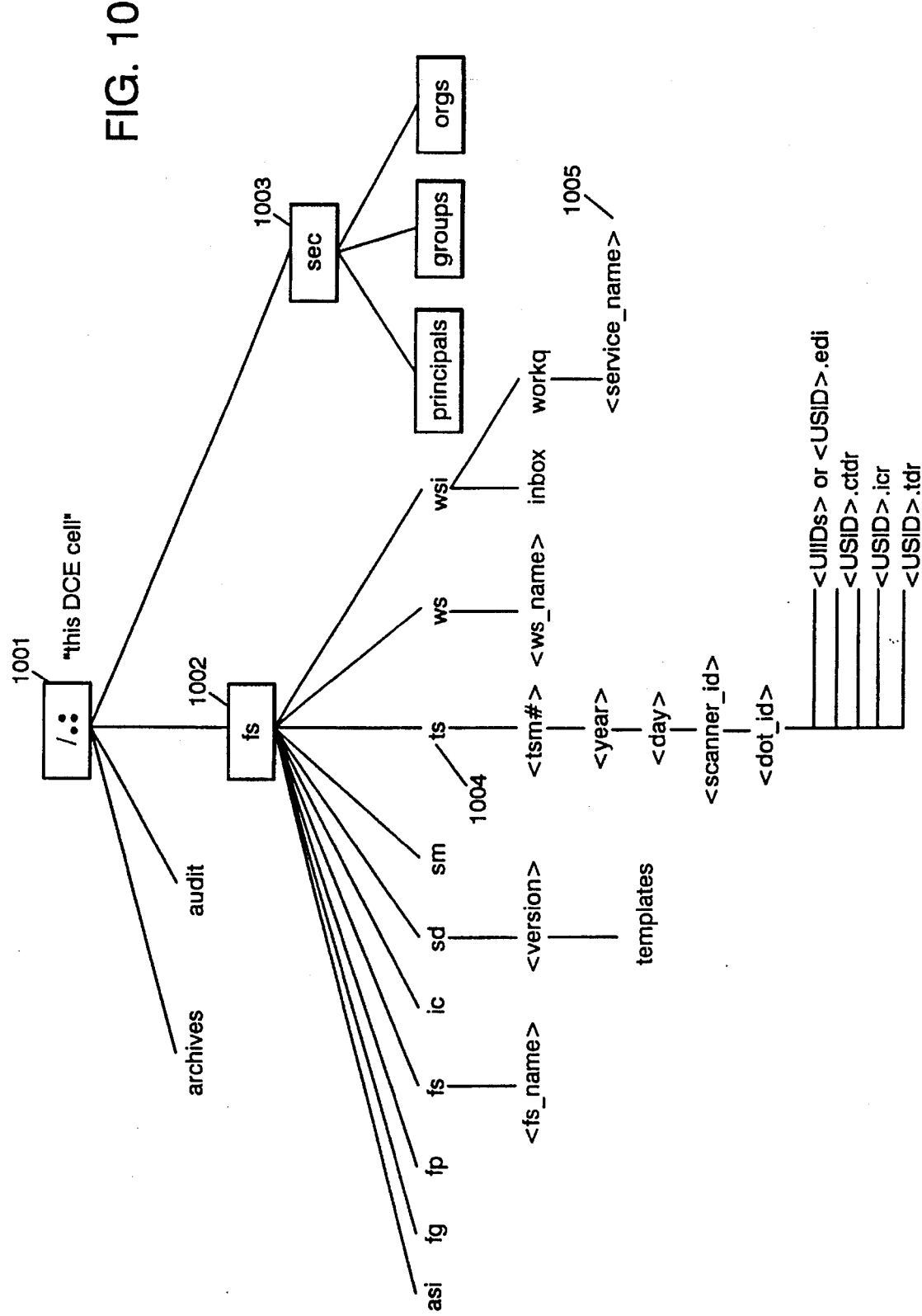
FIG. 10 shows a representative DCE name space for DPS.

FIG. 10 shows a representative DCE name space for DPS.

FIG. 11 is the top-level functional architecture diagram of the WFM.

Figure 12:
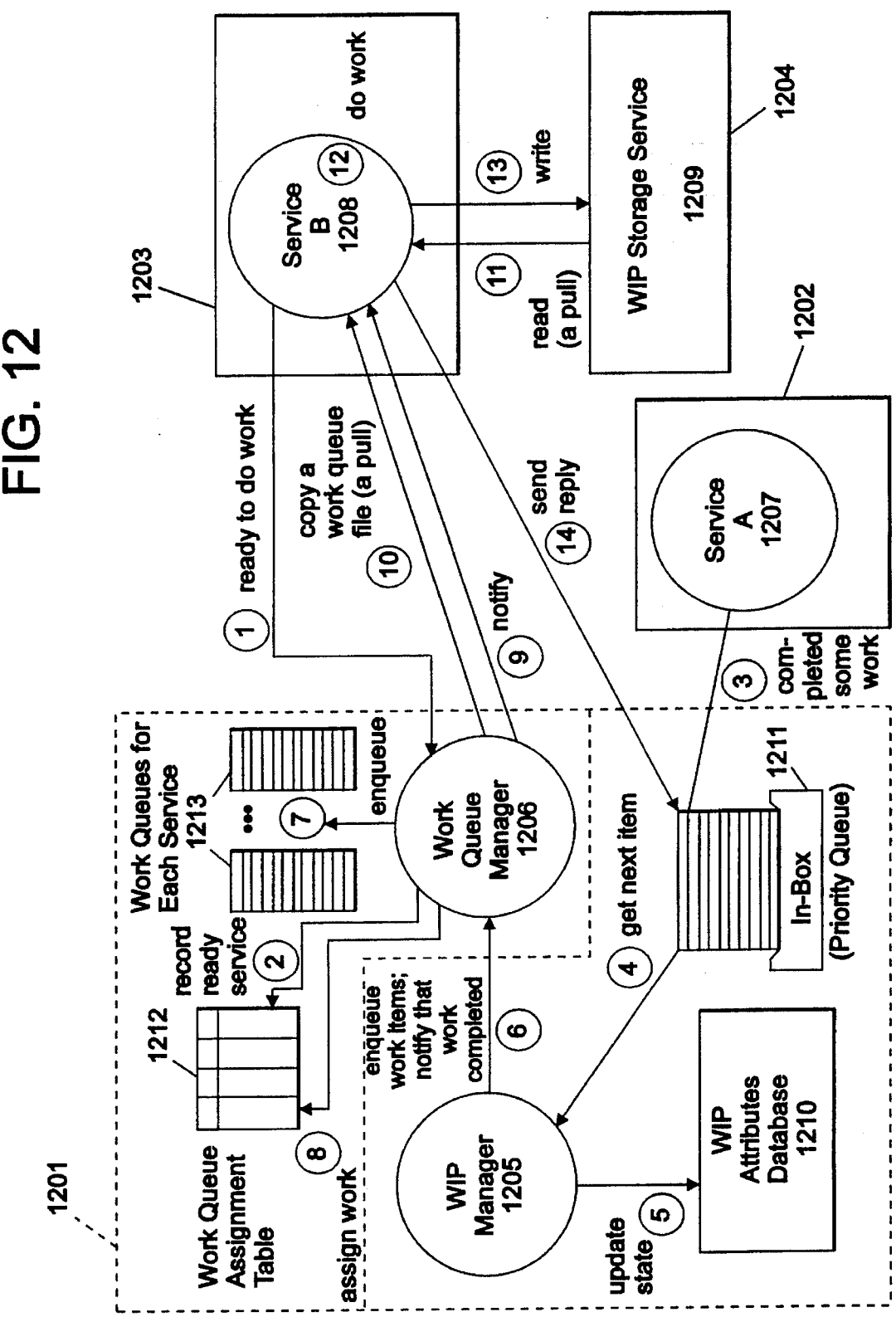

FIG. 12 shows the steps in the invention's common pull protocol.

Figure 14A:
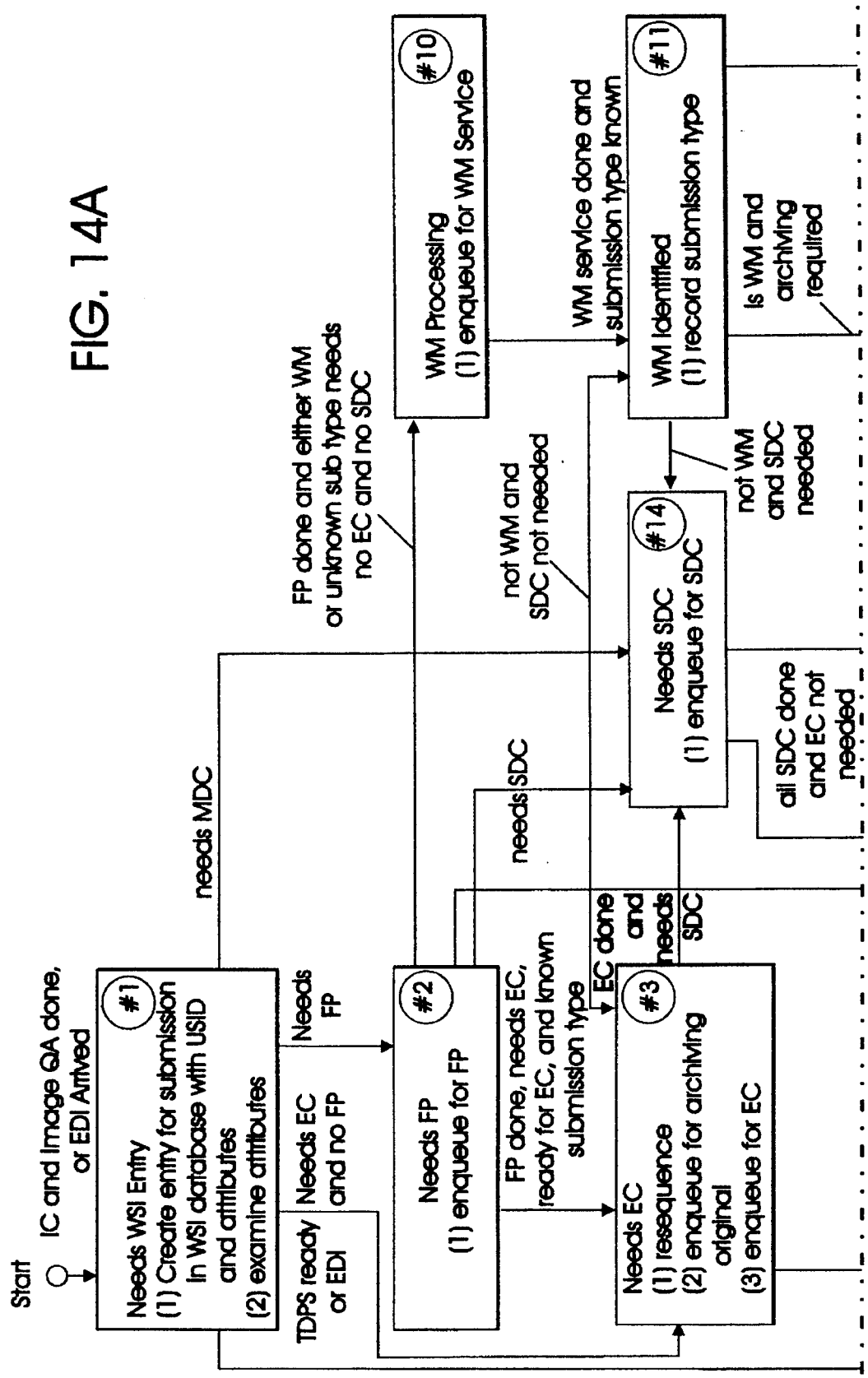
Figure 14B:
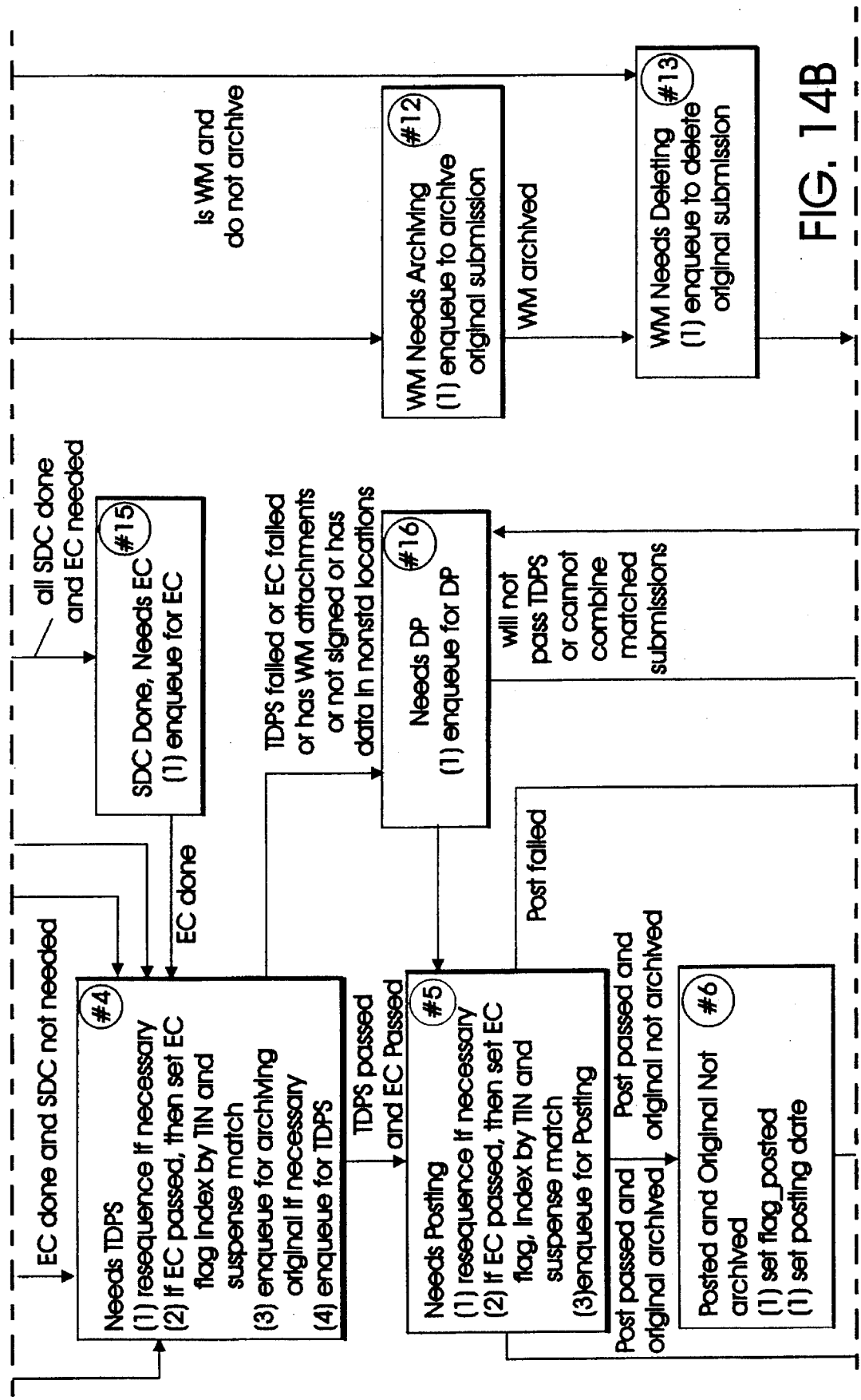

FIG. 13 explains the notation used in FIG. 14 for a state transition diagram, notation adopted from Chapter 5 of reference (Rubmaugh 1991).

FIG. 14 shows an illustrative state transition diagram of the life cycle of a DPS submission.

FIG. 15 contains a flow diagram of the method shown in FIG. 12.

FIG. 16 shows a multimedia, filmless radiology application of the WFM.

DETAILED DESCRIPTION OF PREFERRED EMBODIMENT

1. Context of the Invention

The context of the invention is a distributed computing application with imaged documents, where the image processing software executes on a version of the UNIX operating system (e.g., AIX) with OSF DCE. This section describes an example application context first and OSF DCE context second.

2. Example Application

To illustrate the WFM invention, we use the IRS DPS application, involving the processing of imaged IRS tax submissions (e.g., 1040s), as defined in references (IRS DPS RFP 1991), (IRS DPS RFP Amendments), (IRS DPS RFP Q&A), and (IRS TSM 1991). Other potential applications to illustrate the invention include FBI fingerprint identification in references (FBI IAFIS RFC 1992), (FBI IAFIS SRD 1992), and filmless radiology in reference (Army MDIS RFP 1990). To understand the context of the invention, it is necessary to discuss application-specific work flow detail and a representative systems architecture.

Understanding DPS Pipeline Flow

IRS refers to the flow of work in a Service Center for the processing of incoming tax submissions as the pipeline process. We present DPS pipeline flow with the following topics:

(a) DPS Work Flow Overview (b) A User's View of DPS Operations (c) A Representative Distributed Architecture for DPS (d) Automatic Flows (e) The Major Flow (f) Comments on Entity Check (g) Flow Involving Data Perfection (h) Conditional Flow (i) Service Names and Locations (j) Mandatory and Optional DPS Pipeline Services.

(a) DPS Work Flow Overview

DPS work flow involves the scanning, data capturing, data perfecting, and image archiving of paper IRS tax submissions at each of the ten IRS Service Centers. DPS is also responsible for processing EDI ASCII IRS tax submissions and facsimile IRS tax submissions, and for retrieving archived imaged submissions. DPS does not exist currently in 1992; it is part of the overall IRS Tax Systems Modernization (TSM) initiative (IRS TSM 1991) to improve federal tax processing. The intent is that the various component TSM projects will be contracted, built, and installed in the 1990's. Currently, while limited scanning is done today, typically workers at an IRS Service Center manually transcribe data from paper tax submissions. With DPS, images of tax submissions are moved from one function to the next, with minimal human intervention. DPS will use OCR (optical character recognition) and ICR (intelligent character recognition) techniques to minimize manual data entry, however (post-OCR and post-ICR) manual data capture and character recognition correction are still required to complete data capture since OCR/ICR recognition rates are not 100% for all submissions (currently about 85% on average for combined hand-print and machine-print, over about 95% for machine-print).

In general, DPS converts submissions from paper to image, and then from image to ASCII tax data records (TDRs). After validating a TDR with IRS provided software called TDPS (Tax Data Perfection System), which performs interfield addition checks among other things, DPS attempts to post a validated TDR to an external system named CAPS (Corporate Accounts Processing System). A successful post means that the transaction to add the validated TDR to the tax account of the taxpayer succeeded.

Flow of work (work flow) is conditional. Not all work moves through exactly the same functions; this depends on the current state of a submission. If the paper submission is not imageable or not OCR/ICR-able, then it goes to the manual data capture (MDC) function. If OCR/ICR is not complete, then it goes to the manual character recognition correction (CRC) functions. IRS refers to MDC and CRC together as supplemental data capture (SDC). If the submission is "white mail" (i.e., a letter) or of unrecognizable submission type, then it goes to an external, manual, white mail service for manual processing or manual submission type recognition. If the taxpayer does not use the preprinted label (about 50% of submissions), then its entity data (taxpayer name, address, . . . ) is sent to an external system for an entity check. If a TDR fails the TDPS check or the submission is not signed or the submission is missing component forms, then the submission (images and TDR) goes to the manual data perfection (DP) function where taxpayer notices are created and sent out. If appropriate, from DP the submission can be put into a suspended state, awaiting future taxpayer correspondence.

In general, DPS can archive an imaged tax submission when its submission type is known and, either it has a preprinted label or it passed the entity check; it is not necessary to wait until the submission posts before archiving it. DPS archives the original electronic form of the submission (images, EDI ASCII, facsimile). DPS does not archive the original TDR of a submission, but it does archive a changed TDR (if modified by DP).

(b) A User's View of the DPS Operations

FIG. 1 shows DPS operations form the user's (worker's) perspective; it includes non-DPS functions 110 that provide input to DPS 120. FIG. 1 shows nine steps: (1) delivering mail, (2) unloading the mail, (3) sorting standard-sized containers (envelopes) with the COMPS machines, (4a) processing remittances (e.g., checks), (4b) extracting documents and preparing them for scanning, (5) scanning documents with production scanners and exception scanners, (6) performing SDC, (7) performing DP, (8) operating the archives of imaged submissions, and (9) selectively archiving paper submissions. IRS estimates that over 98% of all paper submissions are production scannable, and that over 99% are scannable. It is expected that eventually, the paper archives, now at Federal Records Centers, will store less than 1% of incoming paper submissions.

FIG. 1 shows various worker roles in 130. The production control monitor is the name of a worker role that oversees pipeline production and runs a daily production meeting. System support worker roles include the system administrator, security administrator, and database administrator. DPS workers are grouped into teams with teams leaders. DPS has a management hierarchy, not sown in FIG. 1.

(c) A Representative Distributed Architecture for DPS

FIG. 2 shows a representative top-level functional system architecture for DPS. This functional architecture diagram shows all major external interfaces to DPS (as internally labeled rectangles with curved corners around the DPS perimeter 200), all major subsystems of DPS (as internally labeled rectangles: 210, 220, 230, 240), all major functions of each subsystem (as a numbered list within each subsystem), and all material flows and data flows (with labeled arrows). This representative DPS architecture has four major subsystems:

Document input Processing Subsystem, 210,

Storage and Retrieval Subsystem, 220,

End User Subsystem, 230, and

Processing Control and Management Reporting Subsystem, 240

FIG. 3 shows a representative distributed architecture for DPS, consistent with FIG. 2. The architecture distributes function across multiple processors for scaling, parallelism, and availability. Each major subsytem contains processor boxes represented as labeled rectangles. Some labeled rectangles represent single processors, some processor clusters (e.g., a pair), and some multiple unclustered processors. A backbone interconnect switch 301, drawn as a tall bold rectangle, connects most of the labeled boxes. FIG. 3 does not show the number of processors of each type, only the function of that box.

The Document Input Processing Subsystem 210 has two major functional components (sub-subsystems): the Image Capture Component 311 and the Forms Processing Component 315. In the Image Capture Component, exactly one scanner 312 is connected to an Image Capture Manager 313, multiple Image Capture Managers can be connected to a FDDI Concentrator 314, and multiple FDDI Concentrators can be connected to the switch 301. In the Forms Processing Component 315, multiple Forms Processing Managers 316, Forms Recognition engines 317, Image Separation engines 318, and Character Recognition π3 engines 319 can be connected to the switch 301. ("Engine" is a synonym for "processor.") One Character Recognition #1 engine and one Character Recognition #2 engine is connected to each Forms Processing Manager 316.

The Storage and Retrieval Subsystem 220 has two major functional components (sub-subsystems): the Temporary Storage Component 321 and the Archival Storage Component 325. The Temporary Storage Component contains one Work-in-Process (WIP) Submission Index Server (processor cluster) 322 and multiple Temporary Storage Servers 323. The Archival Storage Component 325 contains one Archives Submission Index Server (processor cluster) 326, one Archives Server (processor Cluster) 327, multiple Automated Disk Library Servers 328, and one Backup Archives (processor cluster) 329.

The End User Subsystem 230 contains multiple File Servers 331, with multiple Universal Workstations 333 connected to a File Server via a FDDI Concentrator 332.

The Processing Control and Management Reporting Subsystem 240 contains six functions: the Management Reporting Server 341, the System Management Server 342, the Security Server 343, the Software Distribution Server 344, the External Communications Gateway 345, and the EDI ASCII Server 346. Except for facsimile submission images, data communications to/from all DPS external interfaces leave/enter DPS via the External Communications Gateway 345: facsimile submissions enter an Image Capture Manager 313.

(d) Automatic Flows

FIG. 4 summarizes four basic automatic flows (no human intervention after any scanning), 400, as:

| (1) IC, FP, TDPS, Post | 410 |
| (2) IC, FP, EC, TDPS, Post | 420 |
| (3) IC, FP, WM | 430 |
| (4) EDI | 440 |

(1) IC, FP, TDPS, Post. 410. In the representative architecture of DPS, each Image Capture Manager (ICM) 313 performs both submission type recognition and ICR (intelligent character recognition) on the primary form, which is that form that classifies the submission. IC refers to the Image Capture function, which includes scanning, automated quality assurance, submission type recognition, and ICR. Each ICM works on one submission at a time. After submission type recognition and primary form ICR, the ICM writes the submission images and ICR results as files into Temporary Storage 323, then sends an attributes message for this submission to the work-in-process (WIP) manager that executes on the WIP Submission Index Server 322. This WIP manager (with associated work queue manager, protocol, and administration interface) is an instance of the invention WFM. In this representative architecture, submission images have well-defined file names with a common prefix, the USID (unique submission identifier), and an image-relative suffix (e.g., <<USID<;>. 00001, <<USID<;>.00002, . . . ). ICR results appear in a file with the recognition confidence levels.

From the attributes message, the WIP manager creates an entry for this submission in the WIP submission index database, then examines the attributes to determine what to do next. As processing continues, the WIP manager will maintain the state of this and each submission in the WIP submission index database. All submissions go to automated Forms Processing (FP) 315 after IC, where FP creates the initial Tax Data Record (TDR). FP writes the TDR file (e.g., named <<USID<;>.tdr) into Temporary Storage. In this first scenario, we assume that no Entity Check (EC) is needed (e.g., the unchanged IRS label is affixed). So, after FP, the WIP manager routes this submission's TDR to the TDPS service for TDR validation to check interfield arithmetic and other integrity assertions, and awaits the result. In this representative architecture for DPS, the TDPS service executes on each file server 331. If the TDPS result is positive, then the WIP manager routes this submission's TDR to the external Posting service (Post) 353, and awaits the result. If the Posting result is positive, then, except for archiving, we are almost done processing this submission. It is possible that archiving is done before the TDPS check.

In this representative architecture, the enabling condition to archive a submission is when we know the entity (preprinted label affixed or positive EC) and when we know the submission type. The submission type determines the archival retention class (i.e., 7 years for individual returns, 75 years for business and other returns). In this automatic flow scenario, the WIP manager knows the submission type when it first examines the submission attributes. So after the WIP manager creates a database entry for this submission, it simultaneously routes the submission's TDR to the TDPS service and submission's (USID, #images, retention class) to the DPS Archives service. The Archives service, which executes on the Archives Server 327, archives the submission's images then notifies the WIP manager in 322 when this operation completes.

After TDR posting, images are archived and purged from Temporary Storage. A submission's TDR lingers in Temporary Storage for awhile (about 12 days), a DPS requirement. After a required waiting time or after early notification, the WIP manager routes the submission's USID to the File Purging Service and to the TDR Purging Service, to purge (delete) the submission from Temporary Storage.

Two other things happen. First, after both posting and archiving, the WIP manager uses the Submission Index Entry Moving Service, which executes on the Archives Submission Index Server 326, to move the entry for this submission from the WIP submission index database in 322 to the archives submission index database in 326. (This movement can occur during third shift.) Second, the Archived Submission Retention Management Service, which also executes on the Archives Submission Index Server, manages the retention of the archived submission, which can be extended due to court cases.

(2) IC, FP, EC, TDPS, Post. In automatic flow scenario 420, an Entity Check (EC) is required, possibly because an IRS label is not affixed. In this case, after FP, the WIP manager routes the submission to the external EC service 351, and awaits the result. If the EC is positive, then the WIP manager routes work to the TDPS and Posting services, as described in (1), assuming that all results are positive.

(3) IC, FP, WM. In automatic flow scenario 430, submission type recognition in the ICM cannot identify the submission type so the WIP manager routes it to FP, which identifies it as white mail. So, the WIP manager routes it to the external White Mail (WM) service 350. The WIP manager awaits a disposition response from WM to archive or delete the submission.

(4) EDI. 440. The Electronic Filing System (EFS) 354, external to DPS, forwards EDI ASCII submissions to DPS through the EDI ASCII Server 346. In this representative architecture, the EDI In-Bound Service executes in 346 and acts somewhat lie an ICM in that it assigns a USID to each EDI submission, writes the submission file into Temporary Storage 323, and sends an attributes message to the WIP manager in 322. The WIP manager treats this work like other work ,except that the Archives Service would archive the single EDI ASCII file and not image files. We assume here that EFS has already performed EC, TDPS, and Post. In this scenario, the WIP manager needs to archive the EDI submission. If the TDPS failed, then DPS would have to subject the EDI submission to DP. If the EDI TDPS passes and the EFS Post fails, then DPS still needs to archive the submission, but WMS needs to schedule it for Account Perfection, a function outside the scope of DPS.

IRS estimates that electronically filed (ELF) submissions will grow from 25M to 40M, across all 10 Service Centers, or a per Service Center increase from 2.5M to 4M. There are now about 40M submissions per Service Center per year, so the ELF percentage is about 4M/40M=10%.

(c) The Major Flow

Here we consider non-ELF submissions that require ICR. With an average ICR recognition rate of about 85%, almost all (99%) ICRed submissions require some supplemental data capture (SDC). IRS data suggests that about 17% of submissions require data perfection (DP). Also, IRS data suggests that slightly more than half of submissions will have the IRS label affixed. No entity check (EC) is required when the IRS label is affixed. Thus, the major flow is 450: IC, FP, SDC, TDPS, Post.

SDC work is done at universal workstations. In this representative architecture, copies of (read-only) images for SDC work flow from Temporary Storage to file server, then to a universal workstation. Captured ASCII flows from a universal workstation to a file server, then to Temporary Storage. File servers notify the WIP manager of completed work.

(f) Comments on Entity Check

If the submission has an unchanged preprinted IRS label affixed, then EC is not required. If an EC is required and if ICR has sufficient confidence in the recognized entity data, then the WIP manager routes the entity data to EC prior to SDC in 460. If ICR does not have sufficient confidence in the recognized entity data, then the WIP manager routes the submission to SDC for character recognition correction to complete the entity data (and capture other needed data) prior to routing it to EC in 480. Thus, the WIP manager can route a submission's entity data to EC either before SDC or after SDC, depending on the state of the entity data.

FIG. 5 shows how entity check affects the flow. Careful attention to entity data avoids unnecessary keystrokes involving entity data. If entity data must be captured manually, then we capture "short" entity data first, which if necessary may include a name change or address change. If the EC subsequent to the first CRC (character recognition correction, a part of SDC) fails, then the second CRC captures "long" entity data. For unimageable submissions, MDC (Manual Data Capture) also includes interactive entity checking, so it does not go to a batch EC between MDC and TDPS.

(g) Flow Involving Data Perfection

The WIP manager routes work to DP if entity research is required, or the TDPS check fails, or data occurs in non-standard locations on the tax submissions, or the submission is incomplete (e.g., no signature)

(h) Conditional Flow

Clearly, pipeline flow is conditional; it depends on the current state of a submission and what happened to it last. For example, if a submission consists of only one form and the form recognition and ICR in IC suffices, then the submission is not sent to Forms Processing. As another example of conditional flow, if the submission type (i.e., primary form type) is white mail or unrecognized submission, then flow goes to the White Mail Service. FIG. 4 shows examples of conditional flows, and FIG. 5 summarizes the flows.

(i) Service Names and Location

In this representative DPS architecture, DPS software components include built-in services and facilities. A service is a software component that is network-accessible and stand-alone (e.g., Registry Service for login accounts). A facility is a system component that is in many places but not a service (e.g., logic, or remote procedure call). In this representative software architecture, we structure DPS application software into 30–40 different DPS application services. Some services are key pipeline functions (e.g., SDC), whereas other services (e.g., Registry Service) provide support processing. Services may be internal to DPS or interfaces to processing upon which DPS depends, DPS-external services. FIG. 6 lists alphabetically the DPS application services and non-DPS services in the representative architecture, and a short name for each. FIG. 7 shows where these services execute in our representative distributed architecture. Shading of the circles distinguishes among DPS managing services, pipeline services, pipeline support services, and external pipeline processes.

(j) Mandatory and Optional DPS Pipeline Services

There are several services that all submissions use:

Archives Service (Archives)

Posting (Post)

Retention Management (RM)

Tax Data Perfection System (TDPS)

Temporary Storage (TS)

Other services are executed based on the state of the submission. For example, if the submission is not imageable, then it does not go through the Image Capture (IC) function. If the submission is EDI, then it does not go through Forms Processing. The conditional services are:

Account Perfection (AP)

Character Recognition (CR)

Data Perfection (DP)

EDI In-Bound (EDI)

EDI Overlay (EDI-O)

Entity Check (EC)

Forms Processing (FP)

Forms Recognition (FR)

Image Capture (IC)

Image Separation (IS)

Quality Review (QR)

Submission Type Recognition/Initial Character Recognition (STR ICR)

Supplemental Data Capture (SDC)

White Mail (WM)

3. OSF DCE

What IS OSF DCE?

Reference (OSF DCE 1991) provides an introduction to OSF DCE with the following definitions. "OSF's Distributed Computing Environment is a set of services and tools that support the creation, use, and maintenance of distributed applications in a heterogeneous computing environment." "By distributed computing we mean computing that involves the cooperation of two or more machines communicating over a network."

"DCE is based on three distributed computing models—client/server, remote procedure call, and data sharing. The client/server model is a way of organizing a distributed application. The remote procedure call model is a way of communicating between parts of a distributed application. The data sharing model is a way of handling data in a distributed system."

In the client/server model, "the distributed application is divided into two parts, one part on each of two computers that will be communicating during the distributed computation." "The client side of the application is the part that resides on the node that initiates the distributed request and receives the benefit of the service (for example, a workstation that requests that a file be printed). The server side of the application is the part that resides on the node that receives and executes the distributed request (for example, the node with the printer). In this model, two different sets of code are produced—one that runs as a client, the other as a server." It is possible for a server to be a client of another server, and it is possible for more than one server to run on a given node. "The server is typically implemented as a continuous process (daemon); whereas the client is usually implemented as a library. In other words, the client side of an application consists of a call to a routine that executes (sending the request over the network and receiving the result) and then returns and goes on with whatever else it was doing; whereas the server side of an application is a dedicated process that runs continuously-waiting for a request, executing it and returning the answer, then waiting for the next request, and so on."

The remote procedure call (RPC) model is one way of implementing communications between the client and server sides of a distributed application. In this model, the client makes what looks like a local procedure call. However, this procedure call is translated into network communications by the underlying RPC mechanism. The server receives a request and executes the procedure, returning the results to the client.

Some DCE services are based on the <+#>data sharing model,<–#> in which data are shared by distributing them throughout the system. "Like RPC, data sharing assumes the existence of clients and servers. Data sharing focuses on distributed data rather than distributed execution. In RPC, the client's procedure is executed on the server. In data sharing, the server's data are sent to the client. For example, if a client wants to access a file, a copy of the file is sent from the server to the client. The client then proceeds to access the file locally." Data sharing usually entails having multiple copies of the same data, mechanisms for keeping copies of data consistent, and synchronizing multiple access to data. The DCE Directory Service and the DCE Distributed File Service are based on the data sharing model.

FIG. 8 shows the layering of DCE and related software. OSF DCE 802 "is a layer between 801 the operating system and network on the one hand, and 803 the distributed application on the other. DCE provides the services that allow a distributed application to interact with a collection of possibly heterogeneous computers, operating systems, and networks as if they were a single system."

"Several technology components work together to implement the DCE layer. Many o these components provide in a distributed system what an operating system provides in a centralized (single-node) environment." FIG. 9 shows the DCE architecture and its technology components.

As context to the WFM, we are primarily interested in three of the DCE technology components: DCE RPC 901, DCE Directory Service 902, and DCE Distributed File Service 903.

"The DCE RPC facility consists of both a development tool and a runtime service. The development tool consist of a language (and its compiler) that supports the development of distributed applications following the client/server model. It automatically generates code that transforms procedure calls into network messages. The runtime service implements the network protocols by which the client and server sides of an application communicate. DCE RPC also includes software for generating unique identifiers, which are useful in identifying service interfaces and other resources."

"The DCE Directory Service is a central repository for information about resources in the distributed system. Typical resources are users, machines, and RPC-based services. The information consists of the name of the resource and its attributes. Typical attributes could include a user's home directory, or the location of an RPC-based server."

"The DCE Distributed File Service (DFS) allows users to access and share files stored on a File Server anywhere on the network, without having to know the physical location of the file. Files are part of a single, global namespace, so no matter where in the network a user is, the file can be found using the same name".

DCE consists of one or more cells, and each cell consists of a multiplicity of services (and facilities). A DCE cell is both an administrative context and a naming context. A DCE cell contains built-in services and application services. Built-in cell services include the Distributed Time Service, Distributed File Service, and the Security Service.

The DCE Namespace contains four major namespaces, where the security namespace contains three component namespaces. A <+#>namespace<-#> is a domain (set) of names for one or more object classes. The goal of the DCE Namespace is to provide a consistent way to identity and locate people and resources (including files and directories) anywhere in a networked computing environment.

DCE uses hierarchical pathnames that look like UNIX-style pathnames but are interpreted differently. In general a pathname contains three components (from left to right) handled by different mechanisms; (1) a cell name or global object name, (2) a service name or cell object name, and (3) an object name within a service. If a new service is introduced, then that new service can use existing namespaces (e.g., files) or in general it can introduce one or more namespaces for its object classes, and that new service interprets its names. For example, a configuration management and version control service may use special names that it interprets in its special way. As another example, the DCE Security Service interprets the name of principals, groups, and organizations.

An Application of OSF DCE to the DPS
Representative Architecture

We apply OSF DCE to the DPS representative architecture as follows:

(1) Define each of the 10 IRS Service Centers as a separate DCE cell.

(2) Define each DPS application service as a DCE (application) service with an RPC interface.

(3) Use DFS to define a well-known namespace across DPS at each Service Center that includes temporary storage, archival storage, work queues, file server storage, workstation storage, the software distribution server storage, and so on.

(4) Define a new namespace for submissions in archival storage so that we can archive submissions by USID and retention class, retrieve whole or parts of submissions by USID and other attributes, and change the retention class of a submission.

(5) Define two "attribute-based file systems," each with a database to store submission attributes and with DFS to store submission contents: one for temporary storage and one for archival storage. Define an application service to move (migrate) submissions from temporary storage to archival storage.

FIG. 10 shows a representative DCE namespace for DPS that summarizes file names and other DCE names in other hierarchy. In this hierarchy 1001"/:" refers to this cell 1002 "/.:fs/" refers to the namespace for files in DFS ("fs" means file service"), and 1003"/.:sec/" ("sec" means "security") refers to the namespace for the DCE Security Service. In FIG. 10, the boxed names are predefined in DCE; the other names are part of a representative namespace for DPS. For example, 1004 "/.:/fs/ts/" refers to DPS temporary storage, and 1005 "/.:/wsi/workq/<<service_name<;>/" refers to the work queue of a DPS service (e.g., SDC) in the WIP submission index ("wsi"). Using this well-known namespace across DPS at a site, software can refer to files without knowing physical file locations, only knowing local names.

4. Image Work Flow Manager
WFM Architecture

FIG. 11 shows a top-level functional architecture diagram of the invention WFM. This diagram shows the WFM's boundary, external interfaces, major internal functions, owned data, and data flows. This is a functional view that shows functions, with inputs and outputs; it does not show the sequencing of operations. We now elaborate on this diagram.

Notation. The large dark rectangle 1100 represents the WFM's logical boundary. Labeled rectangles (1101, 1102, 1103, 1104, and 1105) externally adjacent to the boundary represent external interfaces. Labeled rectangles (1110, 1120, 1130, 1140, 1150, and 1160) internal to the boundary represent major functions. A numbered list ill a rectangle of a major function lists the next level of functions under that major function. Labeled circular cylinders attached to major function rectangles represent data owned by that major function. Labeled arrows between rectangles represent the flow of data in the indicated direction.

Major Internal Functions and Owned Data. This WFM architecture has six major functions:

(F1) Work Flow Definition, (F2) WIP Manager, (F3) Work Queue Manager, (F4) WIP Attributes Database Manager, (F5) Administration, and (F6) Post-Execution Analysis.

(F1) Work Flow Definition allows the definition of the work flow, which includes the STD, service metadata, and work queue metadata. It owns work flow definition data. (F2) The WIP Manager handles incoming work item results in priority order; it owns an in-box of incoming work item results. (F3) The Work Queue Manager has responsibility for the work queues and work assignments to application services defined by Process Definition; it owns the work queues and the work queue assignment table. (F4) The WIP Attributes Database Manager maintains the state of each WIP object (e.g., IRS submission) and provides support for reports; it owns the WIP attributes database. (F5) Administration allows one to view and change the state of the WFM, to configure or reconfigure the WFM, and to view or (in rare events) fix internal data structures; it owns the configuration data. (F6) Post-Execution Analysis allows one to view the performance data, which it collects and owns.

We implement the major functions with operating system processes. We associate a single, primary, long-lived process with each of the major functions. In this architecture we manage the WIP Attributes Database with a commercial off-the-shelf, relational database management system (RDBMS), typically implemented as an RDBMS server process and application-specific client processes; the WIP Attributes Database Manager is a client process to the RDBMS server process. We can structure the Process Definition a nd Post-Execution Analysis functions as off-line software tools (command USIs), but in this architecture they are integrated as long-lived processes for more direct control from the Administration function.

External Interfaces. This WFM architecture has five external interfaces:

(11) Work Flow Definer Interface,

(12) WFM Administrator Interface,

(13) Database Administrator Interface,

(14) Database Reporting Application Interface, and

(15) Application Services Interfaces.

We assume that there is a separate WFM-external mechanism to start and monitor the operating system processes in the distributed application, including the application service processes and the WFM processes. Such a mechanism is called a Process Manager. In this architecture, the Administration function is not responsible for process management for the processes representing external application services. The WIP Manager and Work Queue Manager functions communicate with external service processes via RPCs, and not via remote execution commands like rsh and rexec. The work flow in the Work Flow Definition function name refers to the end-to-end work flow (process), represented by an STD, services metadata, and work queue metadata.

(11) The Work Flow Definer Interface is a user-system interface (USI) and potentially an application program interface (API). As a USI, the process definer role interactively creates or modifies the STD that drives the work flow. (12) The WFM Administrator Interface is a USI for the WFM administrator role. (13) The Database Administrator Interface is a USI for the database administrator role, which includes establishing and evolving the database schema for the WIP attributes database. While it is possible to combine these three USIs into one role with access to menus for all three USIs, for generality we separate them in this architecture. (14) The Database Reporting Application Interface allows both interactive querying of the WIP Attributes Database a nd periodic report writing. (15) The Application Services Interface is an RPC API.

Data Flows. FIG. 11 shows the WFM data flows.

Other. In this architecture, WIP Object Storage is external to the WFM. No data flows directly between the WFM and WIP Object Storage because this WFM architecture deals with object metadata and leaves the Application Services to read and write WIP objects directly from WIP Object Storage.

WFM Theory of Operation

The invention WFM features centralized control software that includes a WIP manager process 1150 and work queue manager process 1160. These processes interact with application-specific processes structured as application services 1105, and communicate with RPCs.

FIG. 12 summarizes the invention WFM design. In FIG. 12, we show the WIP manager 1205 and the work queue manager 1206 executing on the same processor box (show as one dark rectangle), and Service A 1207, Service B 1208, and WIP Storage Service 1209 executing on different processor boxes (three other dark rectangles). In general, each of these processes can execute on any processor in the distributed computing environment. Service A and B are representative application-specific services.

FIG. 12 contains an "attribute-based file system" that consists of two components: the WIP submission attributes database 1220, and WIP submission storage 1209 (temporary storage). An "attribute-based file system" is a file system that stores both the contents and attributes of application-specific objects such as submissions. In this implementation of an attribute-based file system, we store object contents in files in temporary storage, and we store object attributes (current state and other attribute s) in a database system. This design distinguishes and separates WIP submissions from processed (or archived) submissions, and uses a second attribute-based file system for archived submissions that contains an archived submission attributes database and archived submission storage (archival storage).

The WIP manager owns and uses two major data structures: the in-box of incoming work items 1211, and the WIP attributes database 1210. The WIP manager has a simple control mechanism. It takes the next work item from its in-box, examines it, updates the state of the WIP submission attributes database, as necessary, and hands off work to the work queue manager 1206. The WIP manager has an administrator interface 1102 to control its state, as defined in the state transition diagram that defines its operation. It initialize at start-up, pauses when so told, and proceeds with its job when so told. It works as long as the in-box 1211 is not empty, and sleeps otherwise.

The work queue manager owns and uses two major data structures: the work queue assignment table 1212, and work queues 1213 for each application service to which it dispatches work. The work queue manager also has a simple control mechanism. It receives items from the WIP manager; enqueues them on service-specific work queues; and when a work queue file fills or when a work queue filling time-out occurs, then it notifies the corresponding service of work to do and records the work assignment in a table. When work is completed, the work queue manager updates the work assignment table.

A service interacts with the WIP manager and work queue manager as follows. To get going from scratch, a service sends a notification to the work queue manager that it is ready to do work. If there are multiple instances of the same service, then each of these instances sends a notification when it is ready. Eventually, the work queue manager notifies the service of work to do and the name of a work queue file. The notified service then copies the work queue file, does the work, accesses temporary storage as necessary to get copies of objects, and notifies the WIP manager when it completes the work and any associated outcome (e.g., successful or why unsuccessful).

We use a state transition diagram (STD) to capture the application work flow, with STD notification and definitions from Chapter 5 of (Rumbaugh 1991). A STD is a standard computer science concept, a graphical representation of a finite state machine. FIG. 13 summarizes this notation, which we apply in FIG. 14. An STD is a graphical representation of the life cycle of an object instance of an object class; it relates states and events. A state is an abstraction of the attribute values and associations of an object at a particular time, as the response of the object to input events. An event is something that happens instantaneously at a point in time. "When an event is received, the next state depends on the current state as well as the event; a change of state caused by an event is called a transition." An "STD" is a graph whose nodes are states and whose directed arcs are transitions labeled by event names." We draw a state as a rectangle containing the state name and an activity. An activity is an atomic operation that takes time to complete, starts on entry to the state, and stops before or on exit from the state. "A transition is drawn as an arrow from the receiving state to the target state; the label on the arrow is the name of the event causing the transition. All the transitions leaving a state must correspond to different events" (the finite state machine is deterministic).

Here are some comments on the STD in FIG. 14. It has a start state (a small darkened circle) and a result or end state (two concentric circles with the inner one darkened). States have both names (in bold) and numbers. Events do not include the (optional) attributes, conditions, and actions mentioned in FIG. 13. For an activity, we omit the word "do:". Compound activities contain sequential numbering (i.e., (1), (2), (3) if the next subjectivity must wait for the previous subjectivity to complete, and repeated numbering (i.e., (1), (1) if the subactivities can be executed in parallel.

In programming terms, each STD activity is a UNIX (or UNIX-like) shell script or shell command name. If and as necessary, shell commands are composed to perform the necessary work flow operations. Transactions against the database consist of SQL (Structured Query Language) expressions. It is also possible to specify each STD activity in a programming language like C or C++, with embedded SQL commands.

When shell script is used, the STD is represented in a work flow specification file that is subject to an interpreter program to execute it. When a programming language like C or C++ is used, the work flow specification file needs to be compiled. The WIP manager records events (successful or unsuccessful completed work notifications) in the WIP attributes database, and for a specific submission tests for an STD state transition when it records a completed work notification for that submission. We do not further describe the STD interpreter or STD compiler herein.

The WIP manager maintains the state of each WIP submission and moves each submission through conditional flow steps. To do this, the WIP manager uses the STD that captures the application work flow. FIG. 14 shows a representative STD for DPS. Each entry in the submission table of the WIP submission attributes database 1210 contains a field named current state. The WIP manager records the current state of a submission in this field. In addition, the WIP manager may use one or more single-bit flags (other submission attributes) to maintain other event completion information. With the current state and the state flags, the WIP manager drives each submission through complete processing.

In the DPS example, we use a combination of current state and flags fields, rather than one or more STDs because we perform archiving asynchronously to various pipeline operations. We use several flags to maintain state information about TDRs. In this example, the enabling condition for archiving submission images is when we know the retention class (i.e., submission type) of a submission and when we have a positive entity check. If a submission has a changed TDR, we keep its images in temporary storage until they are ready for purging. DPS requires that images and TDRs can linger in temporary storage until they are ready for purging. DPS requires that images and TDRs can linger in temporary storage up to 26 days (21 days after posting plus an allowed internal backlog of up to 5 days).

FIG. 12 shows in 14 steps an example sequential scenario of how work flows. FIG. 15 is the flow diagram of this method. In general, the participating process (WIP manager, work flow manager, application services) function asynchronously.

(1) Service B 1208 notifies the work queue manager 1206 with an RPC that it is ready for work.

(2) The work queue manager records this potential work assignment in its work assignment table 1212.

(3) Service A 1207 completes work and so notifies the WIP manager 1205 with an RPC that adds the work completion notice to the in-box 1211. (A work completion notice, or completed work item consist of a (USID, result status) pair, where examples of a result status are "EC passed" or "submission archived successfully." A work completion notice can be a batch of such items.)

(4) The WIP manager gets the next item of highest priority from the in-box.

(5) The WIP manager updates the state of the WIP submission attributes database 1210. (Each entry in the WIP submission attributes database consists of a triple (USID, current state, other submission attributes), where the USID uniquely identifies the submission, and current state records the current state of WIP submission as defined in the STD. An example state transition would be that EC just succeeded and now the submission needs a TDPS check.)

(6) The WIP manager tells the work queue manager 1206 with an RPC to enqueue work items, and in the same RPC tells the work queue manager that work completed. (A work item to be enqueued is a (USID, new queue name) pair or a (USID, new queue name, attributes) triple, where USID identifies the submission, the new queue identifies what queue the item goes on, and the item is either a single USID or a (USID, attributes) pair. What attributes to include, if any, depend on the application and on the specific service to perform work next. The goal here is to minimize the size of each enqueued work item, and thus supply only the needed attributes, not all of them. The minimum possible work item is a single USID. For example, to archive a submission in DPS we need to know its USID, submission type, number of images, and its retention class. The submission type, number images, and the retention class are the additional "attributes" needed for the next service. As another example, for a DPS entity check, the "attribute" would contain the entity data.)

(7) The work queue manager enqueues work items on service-specific queues 1213.

(8) When a work queue for Service B 1208 is ready, the work queue manager assigns it to a ready Service B, and records the work assignment in its work queue assignment table 1212.

(9) The work queue manager 1206 notifies Service B 1208 with an RPC of the assignment and the name of the work queue file.

(10) Service B copies the work queue file, a list of (USID, attributes) work items.

(11) Service B reads copies of objects it needs from temporary storage 1209.

(12) Service B performs the work.

(13) Service B writes changed objects or new objects into temporary storage 1209.

(14) Service B completes work and so notifies the WIP manager with an RPC that adds the work completion notice to the in-box.

We refer to the above scenario as the Common "Pull Protocol" for Work-in Process, or the invention's "WFM protocol" for short. A protocol is the sequence of messages (or RPCs) to accomplish some communication objective.

5. WFM Additional Details

The WIP manager owns and used the following data structures:

in-box of items fed by application services, event-action table with scripts that define how to handle in-box items (which is a representation of the STD of the application process), schedule table to record time-of-day based work to do, work priority table, and submission attribute database to record each submission's state.

The WIP manager is table-driven by the event-action table. The WIP manager works off the in-box of items executing them in priority order, as defined in the work priority table. The WFM administrator can modify the work priority table. Given an item from its in-box, the WIP manager uses its item type as an event to find a matching entry in the event-action table, then executes the action. The event-action table records events in a high-level procedural language (a script, e.g., shell script), and the WIP manager uses an interpreter to execute this script language.

The WFM administrator can add to, delete from and modify items from the schedule table to handle time-of-day based work to do. A "cron daemon" (software process) periodically checks the schedule table, and when appropriate adds time-of-day schedule-critical work (with a priority) to the in-box. It is possible to control the application process in some ways through the WIP manager by adding system control items to the in-box. The WIP manager executes normal work, time-of-day critical work, and process command-and-control work via the same in-box mechanism, which executes the highest priority item next and equal priority item in FIFO order.

The WFM (WIP manager and work queue manager) keeps the in-box and work queues on stable storage (DASD) for safety and in RAM for speed; these are so-called "recoverable queues." Also, as appropriate for long work items, the WIP manager uses child stave processes or threads to execute some work items so that the WIP manager is not blocked waiting for a completion. The WIP manager's job is really to remove work from its in-box, then pass off new work to the work queue manager to dispatch.

A service copies a portion of a work queue (e.g., a work queue file) and works on those items. In this way, since the work queue manager still owns the work queue, if a service fails for some reason (or is temporarily disconnected), then the work queue manager can reassign that portion if necessary. This prevents work queue portions from being lost.

6. Work Flow Definition

Of the three subfunctions of Work Flow Definition 1110 listed in FIG. 11, we discuss the first two; we mention the third function (provide simulation, testing, and pre-execution analysis) in FIG. 11 for architectural completeness but it is not part of this invention. The Work Flow Definer role 1101 can configure the WFM anew or reconfigure an existing WFM. The WFM configuration consists of its STD, services metadata, and work queue metadata. The Work Flow Definer role specifies the configuration, but it is up to the Administrator role 1102 to install the configuration. To install a configuration, the STD is installed in the WIP Manager 1150, and work queue metadata is installed in the Work Queue Manager 1160. WFM configuration functions are:

(a) Initialize (or Configure Anew) the WFM.

Work Queue Manager

Specify the name, multiplicity, and work item formal of each application service (to define the work queues and initialize the work queue assignment table).

Specify the work assignment policy (#items per assignable work queue, and time-out interval).

WIP Manager

Specify the STD that drives the WIP manager.

Specify the time-of-day work.

Specify the work priorities based on in-bound item type.

(b) Reconfigure the Existing WFM

Work Queue Manager

Add/Delete/Revise the names of the application services and the multiplicity of each (to define the work queues and initialize the work queue assignment table).

Revise the work assignment policy (#items per assignable work queue, time out interval)

WIP Manager

Revise the STD that drives the WIP manager.

Revise the time-of-day work.

Specify the work priorities based on in-bound work item type.

7. WFM Administration

The Administrator has a user-system interface 1102 with the following functions:

(1) Start, stop, work, or rest the WFM.

(2) Configure, reconfigure, or check the WFM.

(3) View or fix the in-box (4) View or fix the work queues.

(5) View or fix the state of a WIP object.

The WIP Manager has a simple STD that defines its operation with states for resting, working, and sleeping. It sleeps when the in-box 1211 is empty and it has not received the rest command. In the resting state, it can configure, reconfigure, or check the configuration. Likewise the Work Queue Manager has a STD with the same states but no sleeping state. The WFM as a whole has a similar STD that follows Administrator commands (start, stop, work, rest, configure, reconfigure, check) to drive the previous two STDs.

The Administrator can view the state of internal data structures and, if needed in rare events, fix the state of internal data structures.

8. WFM Post-Execution Analysis

This function collects performance data (production rates and cycle times by type of work item and by service), generates reports, and provides a USI to this data. We do not provide its detail here.

9. WFM Properties

This WFM has the following properties.

P1. Simple Mechanism. Both the WIP manager and the work queue manager have simple well-defined jobs.

P2. Uniform and General Protocol. The same WFM protocol is used to interact with each of the potentially many application services.

P3. "Pull System" Design. Each application service pulls work only when it is ready; the WFM does not push work on an application service. Thus, the WFM accommodates services with different processing rates, and allows multiple instances of particular services to achieve a system with a balanced continuous flow. This design flow-controls work to potentially slower external services.

P4. Scalable. This WFM can scale in the number of application services. In the example IRS DPS application, DPS-external work flow application services include WM, EC, IDRS, and Post, and DPS-internal work flow application services include FP, TDPS, SDC-CRD, SDC-MDC, DP, Archives, Entry Move, Purge File, and Purge TDR.

P5. Application Generality and Flexibility. An application-specific state transition diagram defines the work flow that the WIP manager used to drive work items to completion.

P6. Service-unique Work Items. To conserve on space in work queues, a work item need not contain all attributes of a submission; it can contain only the attributes that service requires. Some services require only the unique submission identifier (USID), whereas other services require additional attributes but not all.

P7. Batches of Work Items. The work queue manager maintains one logical work queue for each service. Each logical work queue can be implemented as a collection of files with some policy for determining the number of work items per file (e.g., either 1,000 work items per file, or less if a time-out occurs). All work queues can be implemented as subdirectories of a well-known directory (e.g.,/:fs/workq/" on OSF DCE DFS) accessible by all services. Thus, each service picks up, processes, and returns results of a batch of work items at a time. Using batches is an efficiency.

P8. Hierarchical Instances of This WFM. It is possible to use hierarchical instances of this WFM for an application. By "hierarchical" we mean that one instance is the root of a tree of a tree and each other instance is subordinate (a parent-child relationship) to a previous instance. For example, in the IRS DPS application a root WFM executes on the WIP Submission Index Server and oversees the subordinate work flow. In addition, a smaller WFM instance executes on each file server to apportion its work items to the workstations connected to it. Since subordinate WFMs can use different batch sizes, one possibility might be to use 1,000-item batches between the root WFM and each file server, and use 100-item batches between a file server and workstation. As an aside, each file server and workstation can have a Staging Manger process (with a work queue) to stage work from temporary storage to file servers, and from file servers to workstations. The purpose of the staging mechanism is to provide an end-to-end system design with excellent response time at a workstation.

P9. Easy Administration. For WFM administration, this WFM features a user-system interface with commands to configure/reconfigure, control, and monitor statistics.

A Multimedia Application

The invention WFM applies to multimedia applications too, not just document image processing applications. As one example, it can be used for a voice identification application potentially for the FBI. For this application, audio files (e.g., wire-tapping evidence) can be matched against previously stored voice print files, where the matching can be a combination of automatic (software) and interactive (human) analysis at "knowledge worker" workstation with audio analysis and playback capability. Another multimedia application of the WFM is for a filmless radiology process, which is described below.

Filmless radiology involves the use in hospitals of modalities, medical imaging devices, that produce electronic images rather than film. The electronic images can be shipped by LAN (or WAN or satellite) to a radiologist's workstation for diagnosis, then to an image archives and to the workstation of the attending physician.

Medical records and orders for medical images typically involve text, however, the medical images themselves can be a set of images usually viewed as still images but potentially reviewable as a small movie for some modalities, and radiologist's diagnosis involve audio.

Typically, a radiologist dictates diagnoses onto tape in a recording machine, the tapes go to a typist for manual transcription, and the radiologist reviews and approves the transcribed text. Each approved diagnosis is associated with the corresponding medical images in the radiology information system or with the patient record in the hospital information system. With emerging voice recognition technology, this process may be replaced with automated transcription. Yet, another possibility is to store the audio diagnosis file as is with no transcription.

FIG. 16 shows an example multimedia application of the WFM for filmless radiology. Many work flow applications are order-entry applications where you place orders for some product or service and that order is processed. Filmless radiology is an order-entry application.

FIG. 16(a) shows the flow diagram of an example radiology process. First in 1601, an order is entered to perform medical imaging on a patient. Then 1602 the patient visits the modality area or room, an the modality operator uses the modality to capture images. In 1603, these images are forwarded electronically to a radiologist for diagnosis. For simplicity, we assume here that the system stores audio diagnosis files as is with no accompanying transcription. In 1604, the medical images and associated diagnosis are archived. In 1605, the medical images and associated diagnosis are reviewed by the attending physician.

FIG. 16(b) shows an example STD of the filmless radiology application. In the Entering Order state, 1611, a hospital worker enters the medical imaging order, as requested by the attending physician, into the WIP (work-in-process) database, and schedules the patient on the modality. The system provides modality operators with a daily schedule of patients for imaging. If the patient no-shows, 1612, then a hospital worker will need to reschedule or cancel the patient. Otherwise, after medical imaging, patient data and medical images arrive in the work flow system. In the Needs Diagnosis state, 1613, the WFM records image metadata with associated patient data in the WIP database, and enqueues this work item for a radiologist. The WFM dispatches work items to radiologist. In the Needs Archiving state, 1614, when the diagnosis is done, the WFM enqueues the images and diagnosis for archiving, sends the data to the workstation of the attending physician, and notifies the attending physician that the order is completed. In the Needs Review state, 1615, the attending physician reviews the images and diagnosis, consults with the radiologist if necessary, talks to the patient, and proceeds with treatment or orders additional medical imaging.

For this example, from a software, DCE services, and work queues perspective, the filmless radiology software services include: order entry, medical imaging, diagnosis, archiving, retrieval and review. A transcription service is technology dependent. A retention management service would possibly hold pediatric images until the patient is 21, mammographies for the patient life, and other images for some specified period like three or five years, depending on the medical condition.

What is claimed is:

1. In a data processing system, a method for managing and controlling the flow of imaged documents comprising work items from one function to the next in an application process to achieve the complete processing of said work items, comprising the steps of:

assigning in the data processing system, a unique submission identifier to each incoming submission;

establishing in the data processing system, a repository for work-in-process (WIP) submissions, having an attribute-based file system for WIP submission attributes, and an attribute-based file system for said WIP submission contents;

establishing in the data processing system, a data base of WIP submission attributes that for each submission includes a current state attribute;

storing in the data processing system, said WIP submission contents as files in a distributed file system;

establishing in the data processing system, a repository for archived submissions, having an attribute-based file system for archived submission attributes, and an attribute-based file system for archived submission contents;

defining in the data processing system, when to archive submission contents, when to archive submission attributes, and when to erase submissions from the repository of WIP submissions;

partitioning in the data processing system, an application process into distributed software services and defining a remote procedure call (RPC) interface for each component application service;

defining in the data processing system, an application work flow process with:
 a state transition diagram (STD) that uses said application work flow process;
 a list of the STD-using application work flow processes;
 a service-specific structure of work queues;
 for each service, a structure of the work queue, and policy parameters for the assignment of work queues to services;

executing in the data processing system, a software, work flow, system architecture with functions for a WIP manager, to process incoming work items in priority order from a recoverable priority queue and to move WIP submissions through STD defined states;
 a work queue manager, to manage application and service-specific, recoverable work queues and a work queue assignment table, and to assign work queues to services;
 a WIP submission attributes data base manager, to maintain the state of each WIP submission; and performing in the data processing system, a common pull system protocol for the WIP manager and work queue manager together to communicate with application services.

2. The method of claim 1 wherein said pull system protocol comprises the steps of:

a. service B notifies the work queue manager with an RPC that it is ready for work;

b. the work queue manager records this potential work assignment in its work assignment table;

c. service A completes work and so notifies the WIP manager with an RPC that adds the work completion notice to an in-box;

d. the WIP manager gets the next item of highest priority from the in-box;

e. the WIP manager updates the state of the WIP submission attributes data base;

f. the WIP manager tells the work queue manager with an RPC to enqueue work items, and in the same RPC tells the work queue manager that work completed;

g. the work queue manager enqueues work items on service-specific queues;

h. when a work queue for service B is ready, the work queue manager assigns it to a ready service B, and records the work assignment in its work queue assignment table;

i. the work queue manager notifies service B with an RPC of the assignment and the name of the work queue file;

j. service B copies the work queue file;

k. service B reads copies of objects it needs from temporary storage;

l. service B performs the work;

m. service B writes changed objects or new objects into temporary storage;

n. service B completes work and so notifies the WIP manager with an RPC that adds the work completion notice to the in-box; and o. service B notifies the work queue manager with an RPC that it is ready for work.

3. The method of claim 1 wherein said submission represents multimedia documents.

4. The method of claim 1 wherein said method applies to a distributed architecture.

5. The method of claim 1 wherein said embedded STD captures and defines an application and its application-specific services.

6. The method of claim 1 wherein said component application service represents either a single instance of that service or multiple instances of that service.

7. The method of claim 1 wherein said component application service represents at least partially automated work, with work completion results entered and maintained on-line.

8. The method of claim 1 wherein said repository for WIP submissions and said repository for archived submissions can be combined into one repository for both WIP and archived submissions.

9. The method of claim 1 wherein said repositories for WIP and archived submissions are implemented with a single attribute-based file system using hierarchical storage with automatic caching and migration between successive levels.

10. The method of claim 1 wherein there is a small set of submission types that partitions the submissions, and the application work flow process is defined by several STDs, one for each submission type.

11. The method of claim 2 wherein said work queue manager maintains one logical work queue for each service and apportions out a batch of work items at a time, with each logical work queue implemented as a collection of files with a policy for determining the number of work items per file.

12. The method of claim 2 wherein said objects in step (k) are files that represent multimedia documents.

13. The method of claim 2 wherein said pull system protocol operates as a subordinate hierarchical method.

14. The method of claim 2 wherein said service B can selectively request and get work either (a) only when all previous work is completed, or (b) in anticipation to satisfy a fast response time requirement for the the ready for work notice.

15. In a data processing system, a method for managing and controlling the flow of imaged documents comprising work items from one function to the next in an application process to achieve the complete processing of said work items, comprising the steps of:

executing in the data processing system, a work flow method including a work in process (WIP) manager, to process incoming work items in priority order from a recoverable priority queue and to move WIP submissions through state transition diagram (STD) defined states;

said work flow method further including a work queue manager, to manage application and service-specific, recoverable work queues and a work queue assignment table, and to assign work queues to services;

said work flow method further including a WIP submission attributes data base manager, to maintain the state of each WIP submission; and performing in the data processing system, a common pull system protocol for the WIP manager and work queue manager together to communicate with application services, said pull system protocol comprising the steps of:
   a. service B notifies the work queue manager with a remote procedure call (RPC) that it is ready for work;
   b. the work queue manager records said ready to work notification in its work assignment table;
   c. service A completes work and so notifies the WIP manager with an RPC that adds the work completion notice to an in-box;
   d. the WIP manager gets the next item of highest priority from the in-box;
   e. the WIP manager updates the state of the WIP submission attributes data base;
   f. the WIP manager tells the work queue manager with an RPC to enqueue work items, and tells the work queue manager that work completed;
   g. the work queue manager enqueues work items on service-specific queues;
   h. when a work queue for service B is ready, the work queue manager assigns it to a ready service B, and records the work assignment in its work queue assignment table;
   i. the work queue manager notifies service B with an RPC of the assignment and the name of the work queue file;
   j. service B copies the work queue file;
   k. service B reads copies of objects it needs from temporary storage;
   l. service B performs the work;
   m. service B writes changed objects or new objects into temporary storage;
   n. service B completes work and so notifies the WIP manager with an RPC that adds the work completion notice to the in-box; and
   o. service B notifies the work queue manager with an RPC that it is ready for work.

16. In a data processing system, a method for managing and controlling the flow of imaged documents comprising work items from one function to the next in an application process to achieve the complete processing of said work items, comprising the steps of:

processing with a work in process (WIP) manager in the data processing system, work items from one function to the next in priority order from a recoverable priority queue and moving WIP submissions through state transition diagram (STD) defined states;

accessing with a work queue manager in the data processing system, application and service-specific, recoverable work queues;

maintaining with a WIP submission attributes data base manager, a state of each WIP submission in the data processing system; and communicating with a common pull system protocol in the data processing system, between the WIP manager and work queue manager and application services and performing the common pull system protocol to move items from one function to the next to achieve the processing of work items, wherein said step of communicating with said common pull system protocol includes the steps of:
   a. service B notifies the work queue manager with a remote procedure call (RPC) that it is ready for work;
   b. the work queue manager records said ready to work notification in its work assignment table;
   c. service A completes work and so notifies the WIP manager with an RPC that adds the work completion notice to an in-box;
   d. the WIP manager gets the next item of highest priority from the in-box;
   e. the WIP manager updates the state of the WIP submission attributes data base;
   f. the WIP manager tells the work queue manager with an RPC to enqueue work items, and tells the work queue manager that work completed;
   g. the work queue manager enqueues work items on service-specific queues;
   h. when a work queue for service B is ready, the work queue manager assigns it to a ready service B, and records the work assignment in its work queue assignment table;
   i. the work queue manager notifies service B with an RPC of the assignment and the name of the work queue file;
   j. service B copies the work queue file;
   k. service B reads copies or objects it needs from temporary storage;
   l. service B performs the work;
   m. service B writes changed objects or new objects into temporary storage;
   n. service B completes work and so notifies the WIP manager with an RPC that adds the work completion notice to the in-box; and
   o. service B notifies the work queue manager with an RPC that it is ready for work.

* * * * *